US008329118B2

(12) United States Patent
Padmanabhan et al.

(10) Patent No.: US 8,329,118 B2
(45) Date of Patent: Dec. 11, 2012

(54) METHOD AND APPARATUS FOR DETERMINING ONE OR MORE OPERATING PARAMETERS FOR A MICROFLUIDIC CIRCUIT

(75) Inventors: Aravind Padmanabhan, Plymouth, MN (US); Peter Reutiman, Crystal, MN (US); Eugen I. Cabuz, Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 1258 days.

(21) Appl. No.: 10/932,662

(22) Filed: Sep. 2, 2004

(65) Prior Publication Data

US 2006/0046300 A1    Mar. 2, 2006

(51) Int. Cl.
    *G05D 7/00* (2006.01)
(52) U.S. Cl. ............... 422/504; 137/1; 137/13; 137/14; 137/561; 137/565.01; 436/55
(58) Field of Classification Search ............ 422/50, 422/100, 68.1, 81, 82, 101, 102, 103; 436/43, 436/52, 53, 174, 177, 178, 180, 63; 700/266, 700/282
    See application file for complete search history.

(56) References Cited

U.S. PATENT DOCUMENTS

| | | | |
|---|---|---|---|
| 3,822,095 A | 7/1974 | Hirschfeld | |
| 3,928,094 A | 12/1975 | Angell | |
| 3,976,862 A | 8/1976 | Curbelo | |
| 4,284,412 A | 8/1981 | Hansen et al. | |
| 4,478,076 A | 10/1984 | Bohrer | |
| 4,478,077 A | 10/1984 | Boher | |
| 4,501,144 A | 2/1985 | Higashi et al. | |
| 4,599,000 A | 7/1986 | Yamada | |
| 4,651,564 A | 3/1987 | Johnson et al. | |
| 4,683,159 A | 7/1987 | Bohrer et al. | |
| 4,695,034 A | 9/1987 | Shimizu et al. | |
| 4,704,033 A | 11/1987 | Fay et al. | |
| 4,745,279 A | 5/1988 | Karkar et al. | |
| 4,818,263 A | 4/1989 | Mitch | |

(Continued)

FOREIGN PATENT DOCUMENTS

DE        10122321        4/2002

(Continued)

OTHER PUBLICATIONS http://www.micronics.net/tsensor.htm, pp. 1-4, downloaded Jun. 14, 2000.

(Continued)

*Primary Examiner* — In Suk Bullock
*Assistant Examiner* — Timothy G Kingan
(74) *Attorney, Agent, or Firm* — Seager Tufte & Wickhem LLC.

(57) ABSTRACT

Methods for determining one or more operating parameters for a timing protocol of a microfluidic circuit are provided. In some embodiments, wet out times are measured for certain flow channels, and start times, flow rates and/or other parameters are calculated so that the various fluids in the microfluidic cartridge arrive at certain locations at a desired time and/or in a desired sequence. To help compensate for process variations, one or more fluidic process monitor components/structures may be fabricated along with the functional components/structures of a microfluidic cartridge. Test may be performed on the process monitor components/structures to help identify process variations in the particular microfluidic cartridge at hand. By using the process monitor data, the timing protocol for a particular microfluidic cartridge may be made more accurate.

28 Claims, 14 Drawing Sheets

U.S. PATENT DOCUMENTS

| | | | |
|---|---|---|---|
| 4,874,949 A | 10/1989 | Harris et al. |
| 4,911,616 A | 3/1990 | Laumann, Jr. |
| 4,932,989 A | 6/1990 | Presby |
| 4,980,292 A | 12/1990 | Elbert et al. |
| 5,017,497 A | 5/1991 | Gerard de Grooth et al. |
| 5,050,429 A | 9/1991 | Nishimoto et al. |
| 5,078,581 A | 1/1992 | Blum et al. |
| 5,082,242 A | 1/1992 | Bonne et al. |
| 5,085,562 A | 2/1992 | van Lintel |
| 5,096,388 A | 3/1992 | Weinberg |
| 5,108,623 A | 4/1992 | Cangelosi et al. |
| 5,129,794 A | 7/1992 | Beatty |
| 5,171,132 A | 12/1992 | Miyazaki et al. |
| 5,176,358 A | 1/1993 | Bonne et al. |
| 5,185,641 A | 2/1993 | Igushi et al. |
| 5,194,909 A | 3/1993 | Tycko |
| 5,219,278 A | 6/1993 | van Lintel |
| 5,224,843 A | 7/1993 | van Lintel |
| 5,244,537 A | 9/1993 | Ohnstein |
| 5,323,999 A | 6/1994 | Bonne et al. |
| 5,405,510 A | 4/1995 | Betts et al. |
| 5,413,764 A | 5/1995 | Haar |
| 5,441,597 A | 8/1995 | Bonne et al. |
| 5,452,878 A | 9/1995 | Gravesen et al. |
| 5,457,526 A | 10/1995 | Kosaka |
| 5,510,267 A | 4/1996 | Marshall |
| 5,528,045 A | 6/1996 | Hoffman et al. |
| 5,570,193 A | 10/1996 | Landa et al. |
| 5,601,080 A | 2/1997 | Oppenheimer |
| 5,616,501 A | 4/1997 | Rodriguez |
| 5,620,657 A | 4/1997 | Sizto et al. |
| 5,633,724 A | 5/1997 | King et al. |
| 5,683,159 A | 11/1997 | Johnson |
| 5,716,852 A | 2/1998 | Yager et al. |
| 5,717,631 A | 2/1998 | Carley et al. |
| 5,726,751 A | 3/1998 | Altendorf et al. |
| 5,757,476 A | 5/1998 | Nakamoto et al. |
| 5,760,900 A | 6/1998 | Ito et al. |
| 5,793,485 A | 8/1998 | Gourley |
| 5,799,030 A | 8/1998 | Brenner |
| 5,822,170 A | 10/1998 | Cabuz et al. |
| 5,836,750 A | 11/1998 | Cabuz |
| 5,837,547 A | 11/1998 | Schwartz |
| 5,839,807 A | 11/1998 | Perlo |
| 5,863,502 A | 1/1999 | Southgate et al. |
| 5,874,990 A | 2/1999 | Kato |
| 5,880,474 A | 3/1999 | Norton et al. |
| 5,893,722 A | 4/1999 | Hibbs-Brenner et al. |
| 5,901,939 A | 5/1999 | Cabuz et al. |
| 5,922,210 A | 7/1999 | Brody et al. |
| 5,932,100 A | 8/1999 | Yager et al. |
| 5,948,684 A | 9/1999 | Weigl et al. |
| 5,970,315 A | 10/1999 | Carley et al. |
| 5,971,158 A | 10/1999 | Yager et al. |
| 5,972,710 A | 10/1999 | Weigl et al. |
| 5,974,867 A | 11/1999 | Forster et al. |
| 6,007,775 A | 12/1999 | Yager |
| 6,032,689 A | 3/2000 | Tsai et al. |
| 6,054,335 A | 4/2000 | Sun et al. |
| 6,082,185 A | 7/2000 | Saaski |
| 6,091,197 A | 7/2000 | Sun et al. |
| 6,091,502 A | 7/2000 | Weigl et al. |
| 6,091,537 A | 7/2000 | Sun et al. |
| 6,094,293 A | 7/2000 | Yokoyama et al. |
| 6,097,485 A | 8/2000 | Lievan |
| 6,097,859 A | 8/2000 | Solgaard et al. |
| 6,106,245 A | 8/2000 | Cabuz |
| 6,109,889 A | 8/2000 | Zengerie et al. |
| 6,116,756 A | 9/2000 | Peeters et al. |
| 6,124,663 A | 9/2000 | Haake et al. |
| 6,139,800 A | 10/2000 | Chandler |
| 6,179,586 B1 | 1/2001 | Herb et al. |
| 6,184,607 B1 | 2/2001 | Cabuz et al. |
| 6,215,221 B1 | 4/2001 | Cabuz et al. |
| 6,237,619 B1 | 5/2001 | Maillefer et al. |
| 6,240,944 B1 | 6/2001 | Ohnstein et al. |
| 6,249,341 B1 | 6/2001 | Basiji et al. |
| 6,281,975 B1 | 8/2001 | Munk |
| 6,382,228 B1 | 5/2002 | Cabuz et al. |
| 6,408,884 B1 * | 6/2002 | Kamholz et al. ............... 137/827 |
| 6,409,832 B2 | 6/2002 | Weigl et al. |
| 6,415,821 B2 * | 7/2002 | Kamholz et al. ............... 137/827 |
| 6,440,725 B1 | 8/2002 | Pourahmadi et al. |
| 6,488,896 B2 | 12/2002 | Weigl et al. |
| 6,549,275 B1 | 4/2003 | Cabuz et al. |
| 6,557,427 B2 | 5/2003 | Weigl et al. |
| 6,581,899 B2 | 6/2003 | Williams |
| 6,594,009 B2 | 7/2003 | Saccomanno |
| 6,597,438 B1 | 7/2003 | Cabuz et al. |
| 6,632,619 B1 * | 10/2003 | Harrison et al. ............... 435/7.2 |
| 6,664,104 B2 | 12/2003 | Pourahmadi et al. |
| 6,674,525 B2 | 1/2004 | Bardell et al. |
| 6,700,130 B2 | 3/2004 | Fritz |
| 6,742,661 B1 | 6/2004 | Schulte et al. |
| 6,743,399 B1 | 6/2004 | Weigl et al. |
| 7,143,785 B2 * | 12/2006 | Maerkl et al. .................. 137/597 |
| 2002/0108096 A1 | 8/2002 | Lee et al. |
| 2002/0108097 A1 | 8/2002 | Harris et al. |
| 2002/0110926 A1 | 8/2002 | Kopf-Sill et al. |
| 2002/0149766 A1 | 10/2002 | Bardell et al. |
| 2002/0183996 A1 | 12/2002 | Lee et al. |
| 2002/0185184 A1 | 12/2002 | O'Connor et al. |
| 2003/0057968 A1 | 3/2003 | Wang et al. |
| 2003/0142291 A1 | 7/2003 | Padmanabhan et al. |
| 2003/0148535 A1 | 8/2003 | Colin |
| 2004/0065143 A1 | 4/2004 | Husher |
| 2004/0072278 A1 | 4/2004 | Chou et al. |
| 2004/0109386 A1 | 6/2004 | Gold et al. |
| 2004/0154933 A1 | 8/2004 | Cosofret |
| 2004/0233424 A1 | 11/2004 | Lee et al. |
| 2005/0105077 A1 | 5/2005 | Padmanabhan et al. |

FOREIGN PATENT DOCUMENTS

| | | |
|---|---|---|
| EP | 0269076 | 6/1988 |
| EP | 0694784 | 1/1996 |
| EP | 1001326 | 5/1999 |
| EP | 1134548 | 9/2001 |
| EP | 1359419 | 5/2003 |
| JP | 60082865 | 5/1985 |
| JP | 61066947 | 5/1986 |
| JP | 10073528 | 3/1998 |
| JP | 2000056228 | 2/2000 |
| JP | 2004257756 | 9/2004 |
| WO | WO95/27199 | 3/1995 |
| WO | WO99/60397 | 4/1999 |
| WO | WO01/09598 | 2/2001 |
| WO | 0210713 | 2/2002 |
| WO | 0210714 | 2/2002 |
| WO | 2004059316 | 7/2004 |
| WO | 2005090983 | 9/2005 |
| WO | 2005108963 | 11/2005 |
| WO | 2005114142 | 12/2005 |
| WO | 2005114144 | 12/2005 |

OTHER PUBLICATIONS http://www.micronics.net/hfilter.htm, pp. 1-3, downloaded Jun. 14, 2000.

http://www.micronics.net/mcytometry.htm, pp. 1-4, downloaded Jun. 14, 2000.

http://www.micronics.net/orcafluidics.htm, pp. 1-4, downloaded Jun. 14, 2000.

Altendorf et al., "Implementation of Novel Optical Detection Methods for Clinically Important Blood Analytes Using Microfabricated Flow Structures (T-Sensors™)", MicroTAS 98, Banff, Canada, Apr. 1998.

Altendorf et al., "Differential Blood Cell Counts Obtained Using a Microchannel Based Flow Cytometer", Solid State Sensors & Actuators, vol. 1, 531, 1997.

Altendorf et al., "Microfabrication Technology for Research and Diagnostics, Silicon Microchannel Optical Flow Cytometry", SPIE Proceedings, Biomedical Optics 96, Jan. 1996.

Altendorf et al., "Results Obtained Using a Prototype Microfluidics-Based Hematology Analyzer", SPIE Biomedical Optics 97, 1997.

Cabuz, et al., "Mesoscopic Sampler Based on 3D Array of Electrostatically Activated Diaphragms", Transducers '99, The 10th International Conference on Solid-State Sensors and Actuators, Digest of Technical Papers, vol. 2, Jun. 7-10, 1999.

Darling et al., "Integration of Microelectrodes With Etched Microchannels for In-Stream Electrochemical Analysis", MicroTAS 98, Banff, Canada, Apr. 1998.

Hatch et al., "Microfluidic Approaches to Immunoassays", SPIE conference on Micromachining and Microfabrication Symposium at Santa Clara, CA, Sep. 20-22, 1999.

Huang. et al., "Development of a Flow Cytometry Based Miniature Chemical Fluid Analysis System Using Fluorescent Microbeads", SPIE Biomedical optics, BIOS 97, conference proceedings, 1997.

Lehman et al., "High-Frequency Modulation Characteristics of Red VCSELs", Electronics Letters, Feb. 13, 1997, vol. 33(4), pp. 298-300. Copyright 1997 IEE.

Ohnstein et al., "Micromachined Silicon Microvalve", Proceedings of MEMS, 1990, IEEE Micro Electromechanical Systems, Napa Valley, California, Feb. 11-14, 1990, pp. 95-98.

Roulet et al., "Fabrication of Multilayer Systems Combining Microfluidic and Microoptical Elements for Fluorescence Detection," Journal of Microelectromechanical Systems, vol. 10, No. 4, pp. 482-491, Dec. 2001.

Shapiro, "Practical Flow Cytometry", third edition, 1995, p. 237.

Strzelecka et al., "Parallel Free-Space Optical Interconnect Based on Arrays of Vertical-Cavity Lasers and Detectors with Monolithic Microlenses", Applied Optics, v. 37(14), May 10, 1998, pp. 2811-2821. Copyright 1998 Optical Society of America.

Terstappen, et al., "Four-Parameter White Blood Cell Differential Counting Based on Light Scattering Measurements", Alan R. Liss, Inc., Cytometery 9:39-43, 1988.

Weigl et al., "Silicon-microfabricated diffusion-based optical chemical sensor," Sensors and Actuators, B 38-39, pp. 452-457, 1997.

Weigl et al., "Diffusion-Based Optical Chemical Detection in Silicon Flow Structures", Analytical Methods & Instrumentation, μTTAS 96 special edition, 1996.

Weigl et al., "Microfluidic Diffusion-Based Separation and Detection", Science, vol. 283, pp. 346-347, Jan. 15, 1999.

Weigl et al., "Optical and Electrochemical Diffusion-Based Detection of Analytes in Complex Samples Using Microfabricated Flow Structures (T-SensorSTM)", Micro- and nanofabn'cated electro-optical mechanical systems for biomedical and environmental applications II—SPIE vol. 3606, Jan. 25-26, 1999.

Weigl et al., "Rapid Sequential Chemical Analysis Using Multiple Fluorescent Reporter Beads", μTTAS 96 Conference Proceedings, 1996.

Weigl et al., "Simultaneous Self-Referencing Analyte Determination in Complex Sample Solutions Using Microfabricated Flow Structures (T-Sensors™)", Proceedings of MicroTAS 98, 81-4, Banff, Canada, 1998.

Weigl, "Microfluidic Diffusion Based Electrochemical Detection Using Microfabricated Flow Structures (T-Sensors™)", Analytical Chemistry, submitted 1999.

Weigl, "Whole Blood Assays Using Microfluidics-Based T-SensorSTm Technology", Medical Design Online, http://news.medicaldesignonline.com/featuresarticles/19990416-5922.html, Apr. 1999.

Weigl, et al., "Fluorescence and Absorbance Analyte Sensing in Whole Blood Based on Diffusion Separation in Silicon-Microfabricated Flow Structures," SPIE Proceedings, J. Lakowitz (ed.), Advances in Fluorescence Sensing Technology III, 1997, pp. 171-181.

Yager et al., "Design of Microfluidic Sample Preconditioning Systems for Detection of Biological Agents in Environmental Samples", SPIE Proceedings, 3515, 252-259, 1998.

Yager et al., "Applying Microfluidic Chemical Analytical Systems to Imperfect Samples", Micro Total Analysis Systems 98, Kluwer Academic Publishers, Dordrecht, 207-212, 1998.

Chovan et al., "Microfabricated devices in biotechnology and biochemical processing," Trends in Biotechnology, vol. 20 No. 3, pp. 116-122, Mar. 2002.

Dutta et al., "Multi-Analyte Detection Handheld Analyzer for Point-of-Care Applicatoin with Disposable Biochips," IEEE, pp. 617-621, 2003.

Melin et al., "A liquid-triggered liquid microvalve for on-chip flow channel," Sensors and Actuators, B 100, pp. 463-468, 2004.

Fedder et al., "Laminated High-Aspect-Ratio Microstructures in a Conventional CMOS Process", Proc. Micro Electro Mechanical Systems Workshop, MEMS 96, San Diego, California, Feb. 11-15, 1996, pp. 13-18.

HemoCue Hb 201+, Operating Manual, pp. 1-41, prior to Dec. 2006.

Lamvik et al., Nonlabeled Secondary Antibodies Augment/Maintain the Binding of Primary, Specific Antibodies to Cell Membrande Antigens, Cytometery 45, pp. 187-193, 2001.

Toshiyoshi et al., "Micromechanical Lens Scanner for Fiber Optic Switches", Proc. 3rd International Conference on Micro Opto Electro Mechanical Systems (MOEMS 99), Aug. 30-Sep. 1, 1999, Mainz, Germany, pp. 165-170.

Toshiyoshi et al., "Surface micromachined 2D Lens Scanner Array", Proc. IEEE?LEOS International Coference on Optical EMMS/Sheraton Kauai Resort, Kauai, Hawaii, Aug. 21-24, 2000, 3 pages.

Tuantranont et al., "Flip Chip Integration of Lenslet Arrays on Segmented Deformable Micromirrors", Part of the Symposium on Design, Test and Microfabrication of MEMS and MOEMS, Paris, France, Mar.-Apr. 1999, SPIE vol. 3680, 0277-786X/99, pp. 668-678.

Tuantranont et al., "MEMS-Controllable Microlens Array for Beam Steering and Precision Alignment in Optical Interconnect Systems", Solid-State Sensor and Actuator Workshop, Hilton Head Island, South Carolina, Jun. 4-8, 2000, pp. 101-104.

* cited by examiner

METHOD AND APPARATUS FOR DETERMINING ONE OR MORE OPERATING PARAMETERS FOR A MICROFLUIDIC CIRCUIT

This invention was made with government support under the DARPA BIOFLIPS Program contract number MDA972-00-C-0029. The U.S. government may have certain rights in the invention.

FIELD OF THE INVENTION

The present invention relates generally to microfluidic circuits, and more particularly to methods and apparatus for determining one or more operating parameters for a microfluidic circuit.

BACKGROUND OF THE INVENTION

There has been a growing interest in the manufacture and use of microfluidic systems for the acquisition of chemical and biological information. Microfluidic systems include devices with features having dimensions on the order of nanometers to 100s of microns, which cooperate to perform various desired functions. For example, micro fluidic devices can be adapted to perform material analysis and manipulation functions, such as chemical, biological and/or physical analyses. Many microfluidic systems have the advantages of increased response time, smaller required sample volumes, and lower reagent consumption. When hazardous materials are used or generated, performing reactions in microfluidic volumes may also enhance safety and reduces disposal quantities.

In some cases, microfluidic cartridges are used in conjunction with a cartridge reader. The cartridge reader may, for example, provide support functions to the microfluidic cartridge. In some cases, for example, the cartridge reader may provide electrical control signals, light beams and/or light detectors, pneumatic control pressures or flows, electric flow drive signals or fields, signal processing, and/or other support functions.

Many microfluidic cartridges include one or more reservoirs, flow channels, valves, pumps, and/or other structures that need to operate in concert to achieve a desired material analysis and/or manipulation function, such as chemical, biological and/or physical analyses. In some cases, specific timing protocols are developed to help ensure that the various operations of the microfluidic cartridge are carried out in the proper order and/or at the proper time. Developing such timing protocols can be a difficult and time consuming process.

In addition, many microfluidic cartridges are manufactured from plastic laminates or molded parts, which can help reduce the size, cost and complexity of the microfluidic cartridge. However, while such manufacturing techniques may provide inexpensive parts, they are typically less dimensionally precise and repeatable, with asymmetrical dimensions and wider tolerance cross-sections. These process variations may produce variations in fluid flows, component performance, etc., from cartridge to cartridge—which can degrade the performance of any timing protocols that are developed in advance for a particular class of microfluidic cartridges.

SUMMARY OF THE INVENTION

The present invention is directed toward methods and apparatus for determining one or more operating parameters for a microfluidic circuit. The one or more operating parameters may relate to, for example, a timing protocol for a microfluidic cartridge.

In some illustrative embodiments, flow rates and/or other suitable parameters are calculated for various flow channels based on the desired microfluidic processing of the microfluidic cartridge. For example, in some cases, it may be desirable to provide a sheath fluid as a sheath that flows around another fluid or sample to form a core flow. In such cases, the flow rate for the sheath fluid may be greater than the flow rate of the core fluid or sample. Thus, the initial desired flow rates for the various flow channels may be selected to achieve the desired microfluidic function.

To help determining one or more operating parameters for a microfluidic circuit, and in one illustrative embodiment, one or more wet out times may be measured for various flow channels using the initial flow rates discussed above, and these wet out times may be compared to expected values. The flow rates for the various channels and/or other suitable parameters may then be adjusted, and then the one or more wet out times may again be measured and compared to expected values. This may continue until the adjusted flow rates produce wet out times that are consistent with the expected values.

In some cases, the flow of one flow channel can affect the flow of another flow channel, particularly if the flow channels are in fluid communication with one another—such as at an intersecting region. In such cases, the wet out times for the two or more flow channels may be measured simultaneously, and compared to expected results. Based on the results, the flow rates for the two or more channels may be adjusted, and this may continue until the measured wet out times are consistent with expected values. The presence of bubbles, back flows, stop flows and/or other flow anomalies may also be monitored and corrected, if desired.

In some cases, a timing protocol may be developed using the adjusted flow rates. For example, start times for each fluid may be calculated based on the wet out times and the length of selected flow channel segments in the microfluidic cartridge. To perform some analysis, it may be desirable to have a first fluid reach a fluid intersection region shortly before a second fluid. In such a case, and depending on the length of the fluid channels to the fluid intersection region, as well as the wet out times discussed above, start times for both the first and second fluids can be calculated. The flow rates used with the timing protocol may be the adjusted flow rates discussed above.

Alternatively, or in addition, it is contemplated that the start times may be adjusted to achieve the desired microfluidic function. That is, the start times, instead of or in addition to, the flow rates may be adjusted to achieve proper functional operation of the microfluidic cartridge. For example, the start times may be adjusted so that each of the fluids reach a specified location in the microfluidic cartridge, such as an intersection region, at a desired time and/or in a desired sequence. In one illustrative embodiment, the fluid rates may be selected for each fluid flow, and the corresponding wet out times may be measured using these fluid rates. Based on the measured wet out times, the initial start times may be adjusted so that each of the fluids reach a specified location in the microfluidic cartridge at the desired time and/or in the desired sequence.

As noted above, many microfluidic cartridges are manufactured from plastic laminates or molded parts, which can help reduce the size, cost and complexity of the microfluidic cartridge. However, while such manufacturing techniques may provide inexpensive parts, they are typically less dimensionally precise and repeatable, with asymmetrical dimensions and wider tolerance cross-sections. These process variations may produce variations in fluid flows, component performance, etc., from cartridge to cartridge—which can degrade the accuracy and/or performance of any timing protocols that are developed in advance for a particular class of microfluidic cartridges.

To help compensate for such process variations, it is contemplated that one or more fluidic process monitor components/structures may be fabricated along with the functional components/structures of the microfluidic cartridge. Test may be performed on the process monitor components/structures to identify process variations in the particular microfluidic cartridge at hand. For example, the process monitor components/structures may include a series of flow channels, sometimes with similar or identical dimensions as the flow channels on the functional part of the microfluidic cartridge. Wet out times of some or all of the process monitor flow channels may be measured to identify the specific wet out times for the microfluidic cartridge at hand, rather than identifying wet out times for a class of microfluidic cartridges generally. By using the wet out times for the particular microfluidic cartridge at hand, the timing protocol for the microfluidic cartridge may be made more accurate. Other fluidic process monitor components/structures may also be provided to help provide data that can be used by a microfluidic card reader to improve the operation and/or performance of a particular microfluidic cartridge.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION

Figure 1:
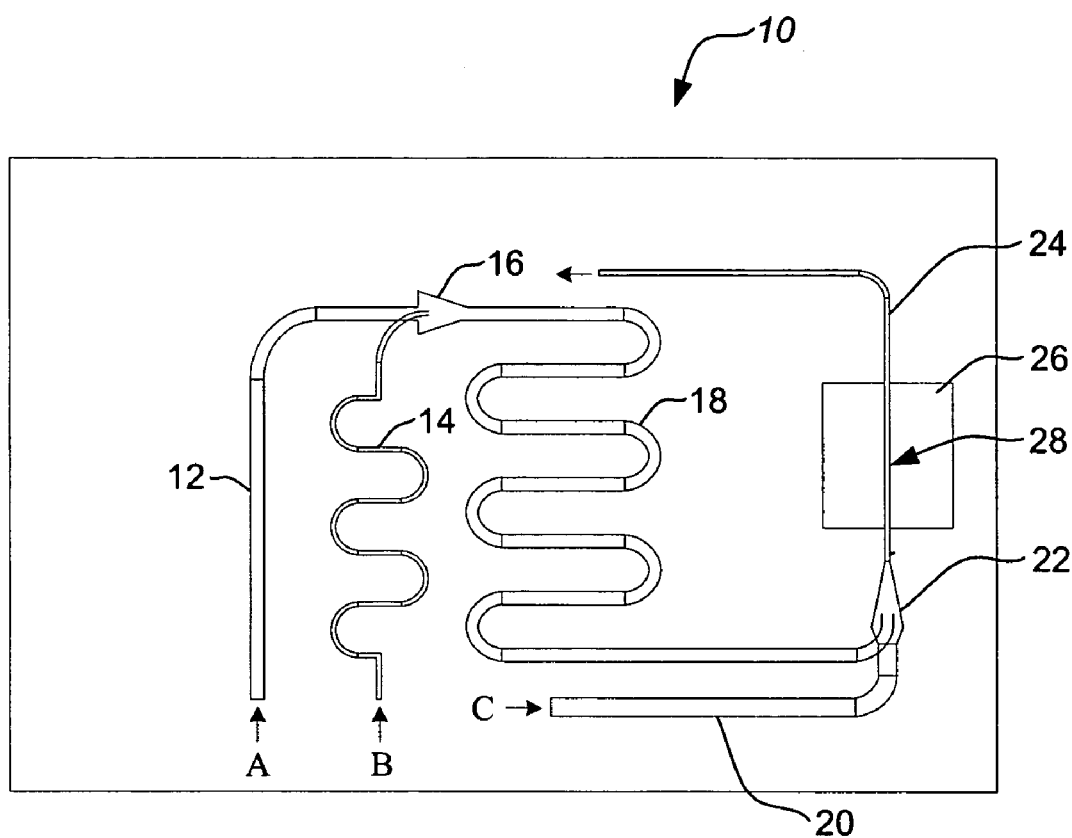
FIG. 1 is a schematic top view diagram showing certain structures of an illustrative microfluidic cartridge.

FIG. 1 is a schematic top view diagram showing certain structures of an illustrative microfluidic cartridge 10. It should be understood that the microfluidic cartridge 10 is only illustrative, and that the present invention can be applied to any microfluidic cartridge regardless of form, function or configuration. For example, the microfluidic cartridge may be used for flow cytometry, hematology, clinical chemistry, blood chemistry analysis, urinalysis, and/or blood gas analysis, electrolyte measurements, etc. It is also contemplated that the illustrative microfluidic cartridge 10 may be made from any suitable material or material system including, for example, glass, silicon, one or more polymers, or any other suitable material or material system, or combination of materials or material systems.

The illustrative microfluidic cartridge 10 includes a first flow channel 12 and a second flow channel 14 that intersect at a first intersecting region 16. A third flow channel 18 extends from the first intersecting region 16. A fourth flow channel 20 intersects the third flow channel in a second intersecting region 22. A fifth flow channel 24 extends from the second intersecting region 22. In the illustrative embodiment, part of the fifth flow channel 24 passes through an optical window region 26 of the microfluidic cartridge 10, which can be used to optically interrogate the flow in the fifth flow channel 24, often using a microfluidic cartridge reader (see FIG. 13).

During normal functional operation of the illustrative microfluidic cartridge 10, a lyse reagent may be provided down the first flow channel 12 at a lyse flow rate, and a blood sample may be provided down the second flow channel 14 at a blood sample flow rate. The blood sample flow rate and the lyse flow rate may be controlled by any suitable pressure source, such as those shown and described below with reference to FIGS. 5 and 6. The term pressure source as used herein may include positive or negative (e.g. vacuum) pressures, as desired.

The lyse reagent and the blood sample are shown intersecting at the first intersecting region 16. The first intersection region 16 may be configured so that the lyse reagent flows circumferentially around the blood sample when fluid from both the first and second flow channels 12 and 14 is flowing through the first intersection region 16. In some cases, the lyse flow rate may be higher than the blood sample flow rate, which may help improve the flow characteristics in the third channel 18, and in some cases, to help form a thin ribbon of blood that is completely and uniformly surrounded by the lying reagent. Such a ribbon flow may help the lyse reagent uniformly lyse the blood cells as they travels through the third flow channel 18.

A sheath fluid may be provided down the fourth flow channel 20 at a sheath flow rate. In the illustrative microfluidic cartridge 10, the lysed blood sample flowing down the third flow channel 18 intersects the sheath fluid at the second intersecting region 22. The second intersection region 22 may be configured so that the sheath fluid flows circumferentially around the lysed blood sample when fluid from both the third and fourth flow channels 18 and 20 is flowing through the second intersection region 22. In some cases, the sheath flow rate is significantly higher than the lysed blood sample flow rate, which may help improve core formation in the fifth channel 24. For example, an in flow cytometry applications, the second intersecting region 22 may be configured to arrange the blood cells in the lysed blood sample in a single file core so that they can be individually optically interrogated by a microfluidic cartridge reader as they pass through optical window region 26.

In many cases, the flow of a fluid in one flow channel can affect the flow in another flow channel. For example, if the flow in the second flow channel 18 enters the first intersection region 16 well before the flow from the first flow channel 12, and has a sufficient pressure, the flow in the first flow channel 12 may be prevented from entering the first intersection region (e.g. stop flow). In some cases, the flow in the second flow channel 18 may actually cause the flow in the first flow channel 12 to reverse (e.g. back flow).

In another example, if the flow in the first flow channel 12 enters the first intersection region 16 well before the flow in the second flow channel 14, then the flow in the second flow channel 14 may introduce bubbles into the third flow channel 18 before the flow in the second flow channel 14 reaches the first intersection region 16. In some cases, bubbles can have adverse downstream effect on the operation of the microfluidic cartridge 10.

These examples are only provided as illustrations of some of the detrimental effects that can be caused by improper timing of the various flows in a microfluidic cartridge 10. As such, and in many cases, specific timing protocols must be developed to help ensure that the various operations of the microfluidic cartridge 10 are carried out in the proper order and/or at the proper time. These timing protocols can include, for example, start times, end times, flow rates, and other characteristics for some or all of the flow channels of the microfluidic cartridge 10.

Figure 2:
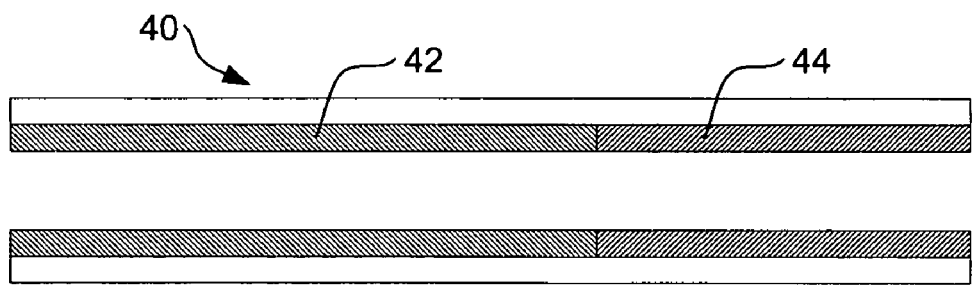
FIG. 2 is a schematic cross-sectional side view diagram showing one illustrative flow channel of microfluidic cartridge of FIG. 1.

In some cases, the surface characteristics of some or all of the flow channels may be designed to help produce the desired flow characteristics and/or timing sequences in the microfluidic cartridge 10. For example, FIG. 2 is a schematic cross-sectional side view showing one illustrative flow channel. In the illustrative embodiment, the flow channel is generally shown at 40, and includes a coating or inner liner on at least part of the inner surface thereof. The illustrative coating or liner includes a hydrophilic surface 42 and a hydrophobic surface 44. When entering from the left, a fluid will thus tend to easily flow along the hydrophilic surface 42, and will tend to flow less easily along the hydrophobic surface 44. In some embodiments, the transition between the hydrophilic surface 42 to the hydrophobic surface 44 may be provided at a location where a corresponding timing protocol indicates that a fluid flow should stop—at least temporarily stop. For example, it may be desirable to have the blood sample flow in the second flow channel 14 stop just before or at the first intersection region 16. Then the lyse reagent may flow through the first intersection region 16, before restarting the blood sample flow again. This may help reduce air (e.g. bubbles) that might otherwise be resident in the second flow channel from being injected into the third flow channel 18.

Figure 3:
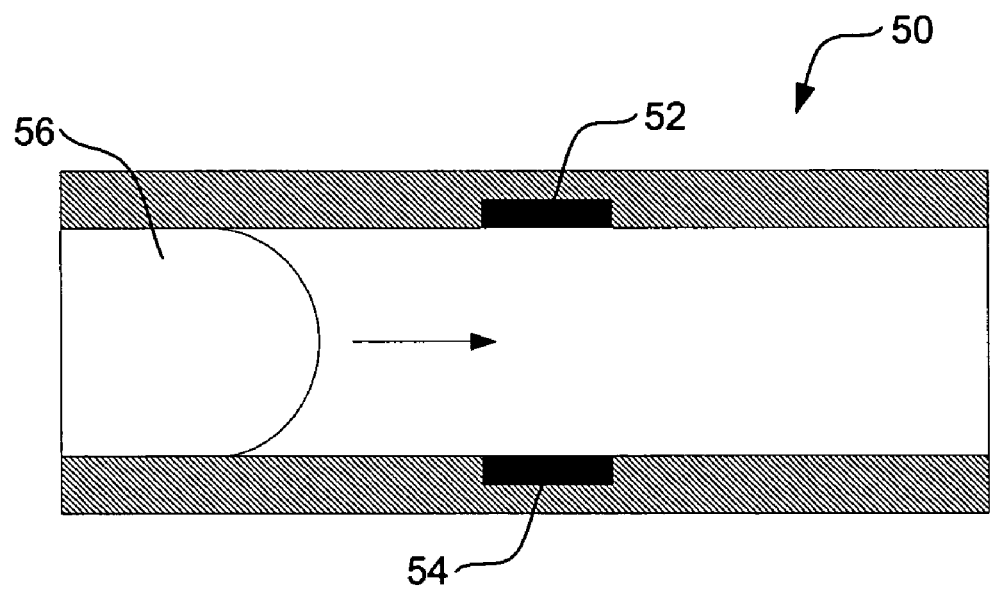
FIG. 3 and FIG. 4 are schematic cross-sectional side view diagrams showing another illustrative flow channel of microfluidic cartridge of FIG. 1 with fluid detecting electrodes.
Figure 4:
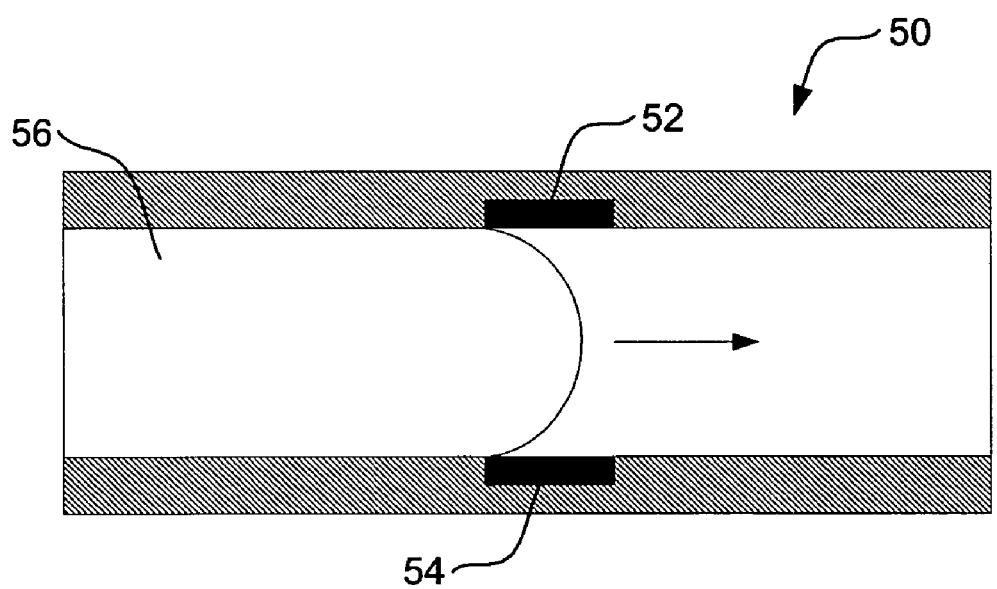

FIG. 3 and FIG. 4 are schematic cross-sectional side view diagrams showing another illustrative flow channel 50 of the present invention. The illustrative flow channel 50 includes two conductive terminals 50 and 52, which are routed to regions within the flow channel 50 that are close to one another but not in connect with one another. Electrical signals through such conductors may be used in a number of ways, both as inputs to the microfluidic cartridge and/or as outputs from the microfluidic cartridge.

Some signals may involve making a circuit, part of which may include the fluid itself within the flow channel 50. Such a circuit may be used to, for example, sense the presence or absence of the fluid at a particular location within the flow channel 50. External electronics may monitor the impedance between the conductors 52 and 54, by, for example, applying a small voltage between them and monitoring the current flow. When no fluid is present, the impedance will be very high. However, when fluid passes the electrodes 50 and 52 in the channel, the fluid will bridge the gap between the two terminals 50 and 52. If the fluids are at least mildly conductive, the fluid will cause the impedance in the circuit to decrease dramatically. This decrease in impedance can be sensed by the electronics, and decisions may be made based on this input. By placing several such circuits along the length of any fluid channel, the external electronics may be used to monitor the fluid velocity and/or wet out times, as further discussed herein. FIG. 3 shows the fluid channel 50 with a fluid 56 that has not yet reached the terminals 50 and 52, and FIG. 4 shows the fluid channel 50 with the fluid 56 making the circuit.

Figure 5:
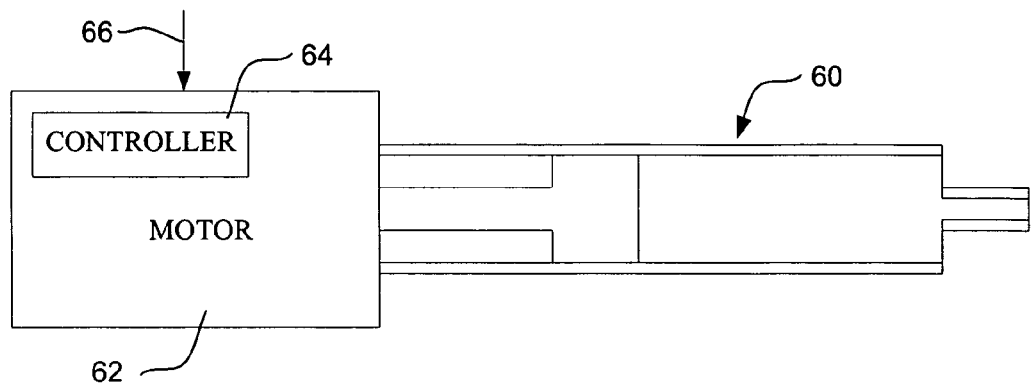
FIG. 5 is a schematic cross-sectional side view diagram showing an illustrative volume driven pressure source that is suitable for supplying pressure to one or more of the flow channels of FIG. 1.

FIG. 5 is a schematic cross-sectional side view diagram showing an illustrative volume driven pressure source that is suitable for supplying pressure to one or more of the flow channels of the illustrative microfluidic cartridge of FIG. 1. In the illustrative embodiment, the volume driven pressure source is a syringe type pump generally shown at 60, driven by a stepper motor 62 or the like. The volume driven pressure source may be controlled by a controller 64, which may receive one or more input signals 66 as shown.

Figure 6:
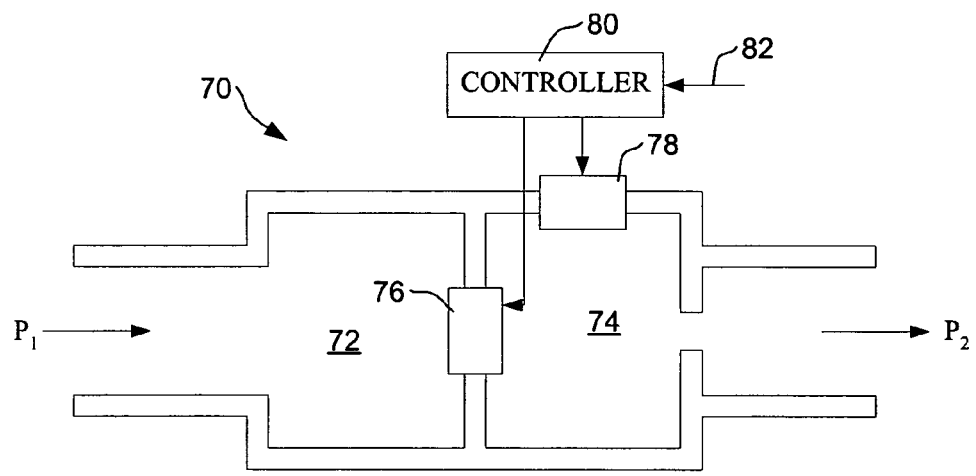
FIG. 6 is a schematic cross-sectional side view diagram showing another illustrative pressure source that is suitable for supplying pressure to one or more of the flow channels of FIG. 1.

FIG. 6 is a schematic cross-sectional side view diagram showing another illustrative pressure source that is suitable for supplying pressure to one or more of the flow channels of the illustrative microfluidic cartridge of FIG. 1. In this illustrative embodiment, the pressure source 70 includes an input chamber 72 and an output chamber 74. A first valve 76 is provided between the input chamber 72 and the output chamber 74, and a second valve 78 is provided between the output chamber 74 and atmosphere. A controller 80, which may receive one or more input signals 82, may control the first valve 76 and the second valve 78.

During operation, the input chamber 72 may receive an input pressure labeled $P_1$ from a pressure source. The controller 80 may instruct the first valve 76 to open to pressurize the output chamber 74, and to produce the output pressure labeled $P_2$. Once the output chamber 74 reaches the desired pressure, the controller 80 may instruct the first valve 76 is close. The controller 80 may also instruct the second valve 78 to open to reduce the pressure in the output chamber 74, if necessary. While FIG. 5 and FIG. 6 show two illustrative pressure sources, it is contemplated that any suitable pressure source may be used to achieve a desired flow rate in the flow channels of the illustrative microfluidic cartridge 10, including both positive pressure sources and negative (e.g. vacuum) pressure sources, as desired.

Figure 7:
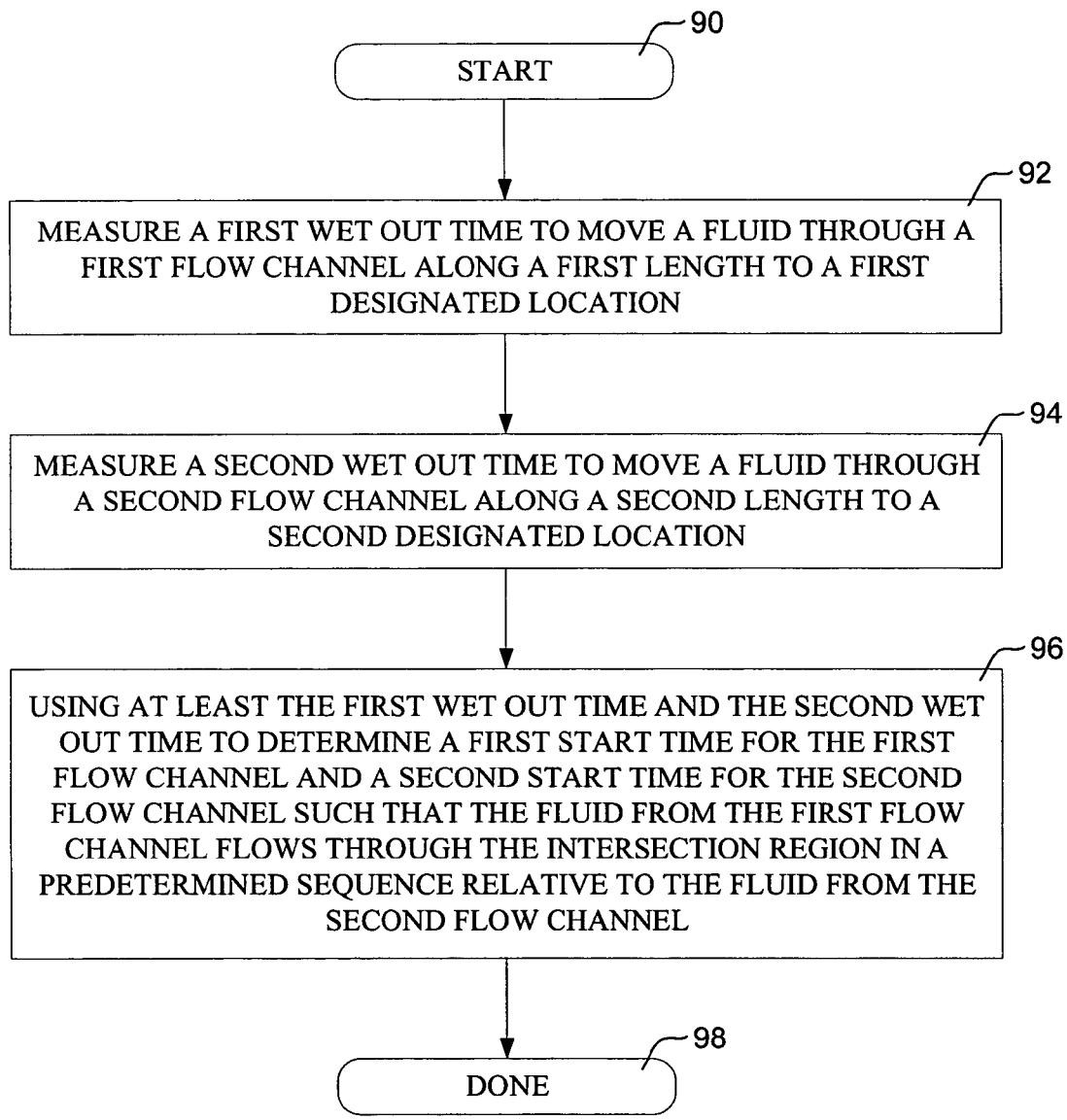
FIG. 7 is a flow diagram showing an illustrative method for determining a control sequence for a microfluidic cartridge that includes two or more flow channels intersecting at an intersection region.

FIG. 7 is a flow diagram showing an illustrative method for determining a control sequence for a microfluidic cartridge that includes two or more flow channels intersecting at an intersecting region. The flow diagram is entered at step 90, and control is past to step 92. In step 92, a first wet out time is measured. The first wet out time may correspond to the time that is required to move a fluid though a first flow channel along a first length to a first designated location. Control is then passed to step 94. In step 94, a second wet out time is measured. The second wet out time may correspond to the time that is required to move a fluid through a second flow channel along a second length to a second designated location. Control is then passed to step 96. In step 96, at least the first wet out time and the second wet out time is used to determine a first start time for the first flow channel and a second start time for the second flow channel such that the fluid from the first flow channel flows through the intersecting region in a predetermined sequence relative to the fluid from the second flow channel. Control is then passed to step 98, wherein the flow diagram is exited.

Figure 8:
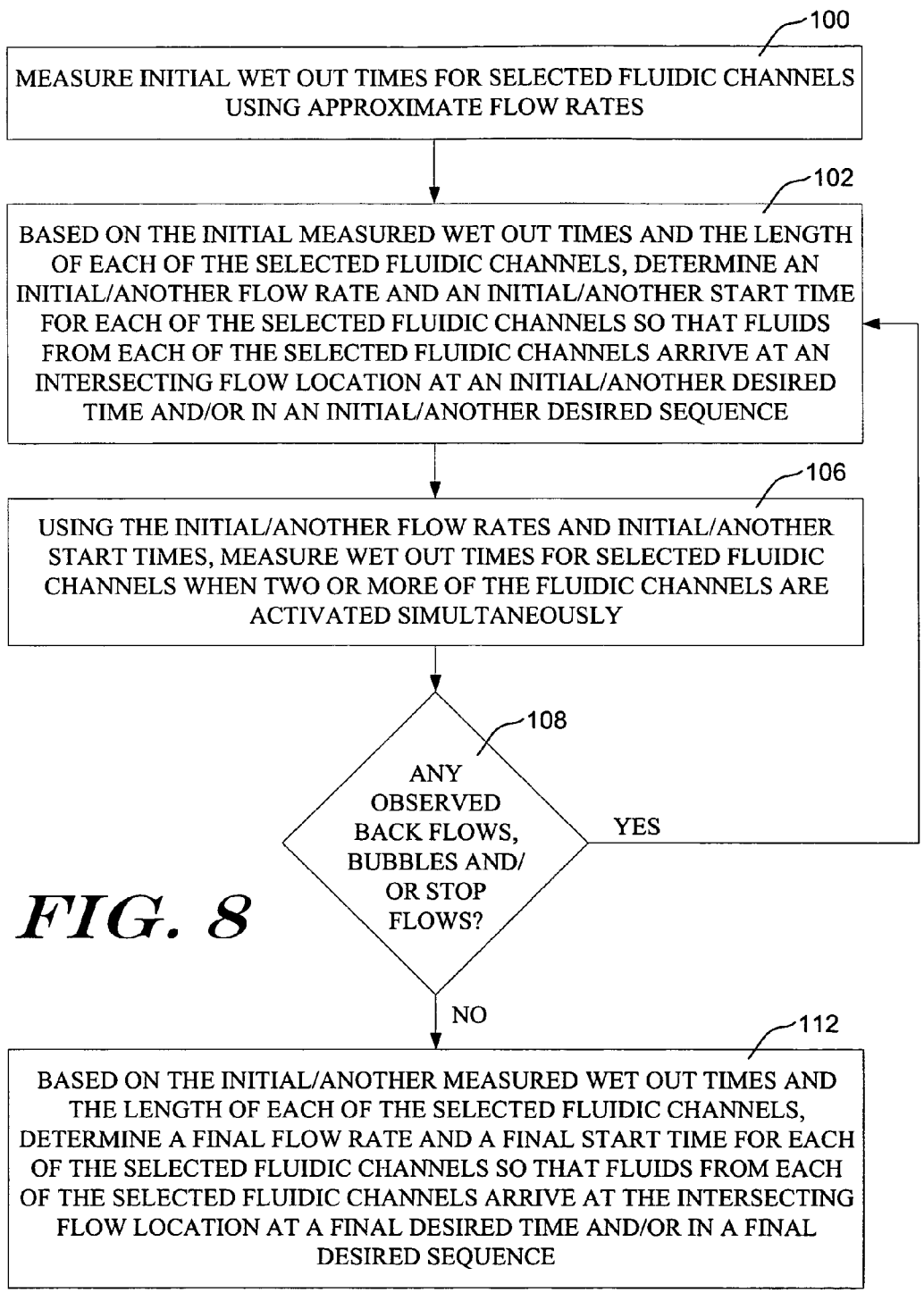
FIG. 8 is a flow diagram showing yet another illustrative method for determining a control sequence for a microfluidic cartridge that includes two or more flow channels that intersect at an intersection region.

FIG. 8 is a flow diagram showing yet another illustrative method for determining a control sequence for a microfluidic cartridge that includes two or more flow channels that intersect at an intersecting region. At step 100, initial wet out times for selected fluidic channels are measured using initial flow rates. Control is then passed to step 102. Based on the initial measured wet out times and the length of each of the selected fluidic channels, step 102 determines initial/another flow rate and initial/another start times for each of the selected fluidic channels so that fluids from each of the selected fluidic channels arrive at an intersecting flow location at an initial/another desired time and/or in an initial/another desired sequence. Control is then passed to step 106.

As indicated above, the flow in one flow channel can affect the flow of another flow channel, particularly if the flow channels are in fluid communication with one another—such as at an intersecting region. As such, an in the illustrative flow diagram, step 106 measures wet out times for selected fluidic channels when two or more of the fluidic channels are activated simultaneously, in some cases, using the initial/another flow rates and the initial/another start times. Control is then passed to step 108. In step 108, observations are made for backflows, bubbles and/or stop flows in the microfluidic cartridge. If any backflows, bubbles, and/or stop flows are observed, control is passed back to step 102, where another start times and/or flow rates are selected. If no backflows, bubbles, and/or stop flows are observed, control is passed to step 112.

Based on the initial/another measured wet out times and the length of each of the selected fluidic channels, step 112 determines a final flow rate and a final start time for each of the selected fluidic channels so that fluids from each of the selected fluidic channels arrive at the intersecting flow location at a final desired time and/or in a final desired sequence.

Figure 9:
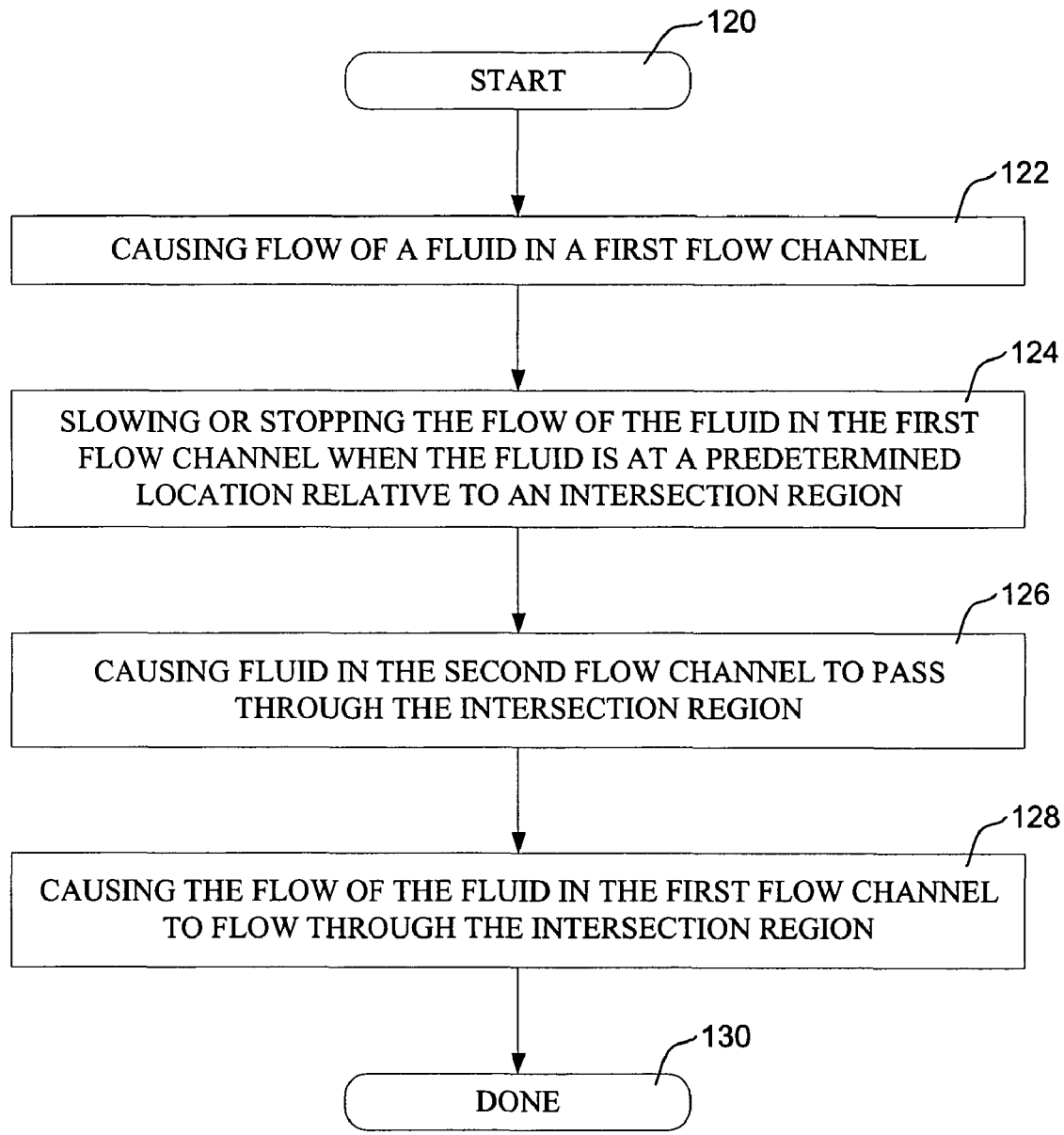
FIG. 9 is a flow diagram showing an illustrative method for controlling the flow of fluid through a microfluidic cartridge that includes two or more flow channels intersecting at an intersection region.

FIG. 9 is a flow diagram showing an illustrative method for controlling the flow of fluid through a microfluidic cartridge that includes two or more flow channels intersecting at an intersecting region. The flow diagram is entered at step 120, and control is passed to step 122. Step 122 causes flow of a fluid in a first flow channel. Control is then passed to step 124. Step 124 slows or stops the flow of the fluid in the first flow channel when the fluid is at a predetermined location relative to an intersecting region. Control is then passed to step 126. Step 126 causes fluid in the second flow channel to pass through the intersecting region. Control is then passed to step 128. Step 128 causes the flow of the fluid in the first flow channel to flow through the intersecting region. Control is then passed to step 130, wherein the flow diagram is exited. This method may help, for example, reduce bubbles in a downstream flow channel of the microfluidic cartridge.

Figure 10:
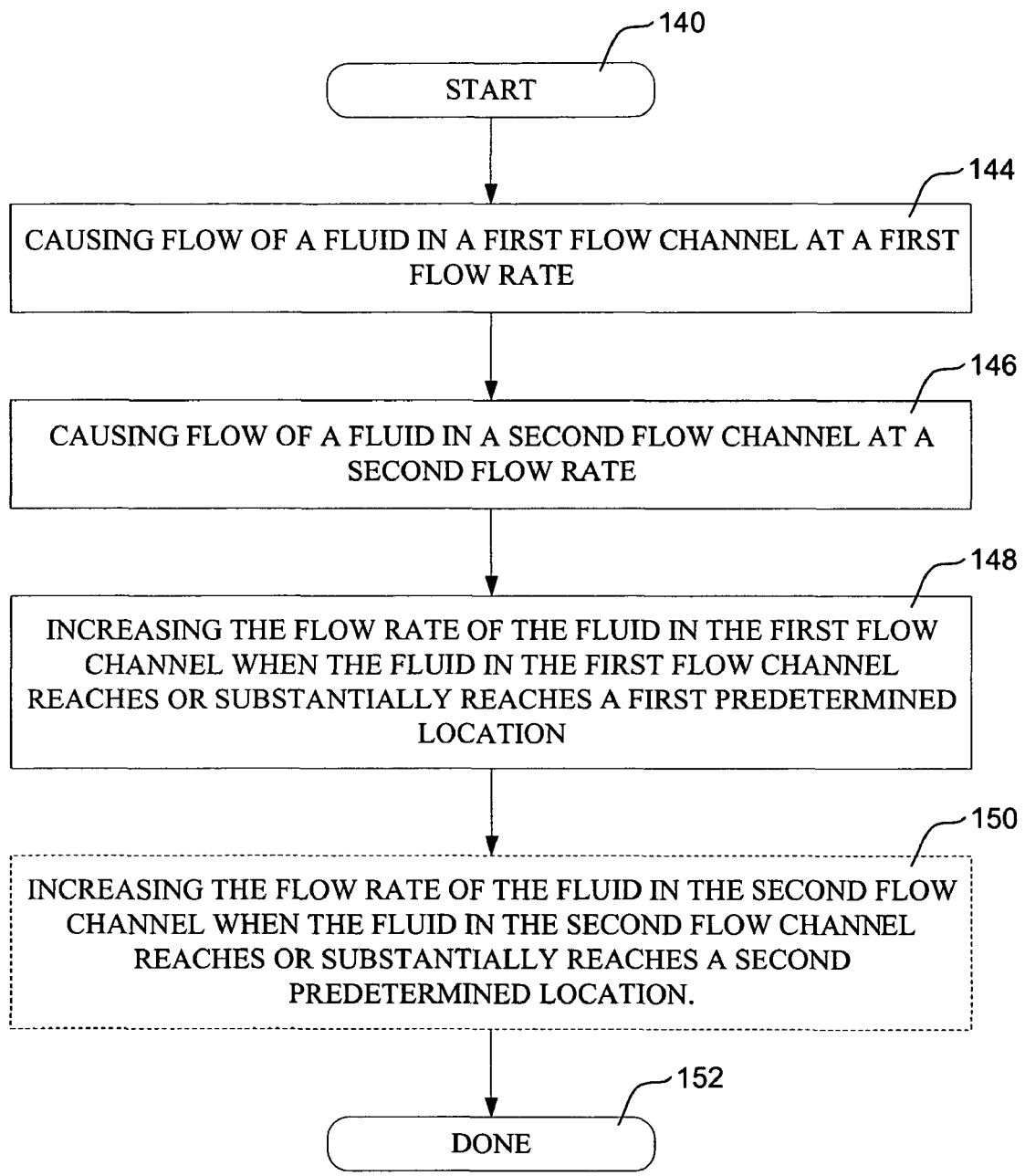
FIG. 10 is a flow diagram showing another illustrative method for controlling the flow of fluid through a microfluidic cartridge that includes two or more flow channels.

FIG. 10 is a flow diagram showing another illustrative method for controlling the flow of fluid through a microfluidic cartridge that includes two or more flow channels. The flow diagram is entered at step 140, wherein control is passed to step 144. Step 144 causes flow of a fluid in a first flow channel at a first flow rate. Control is then passed to step 146. Step 146 causes flow of a fluid in a second flow channel at a second flow rate. Control is then passed to step 148. Step 148 increases the flow rate of the fluid in the first flow channel when the fluid in the first flow channel reaches or substantially reaches a first predetermined location. Control is then passed to step 150. Step 150 increases the flow rate of the fluid in the second flow channel when the fluid in the second flow channel reaches or substantially reaches a second predetermined location. Control is then passed to step 152, wherein the flow diagram is exited.

Figure 11:
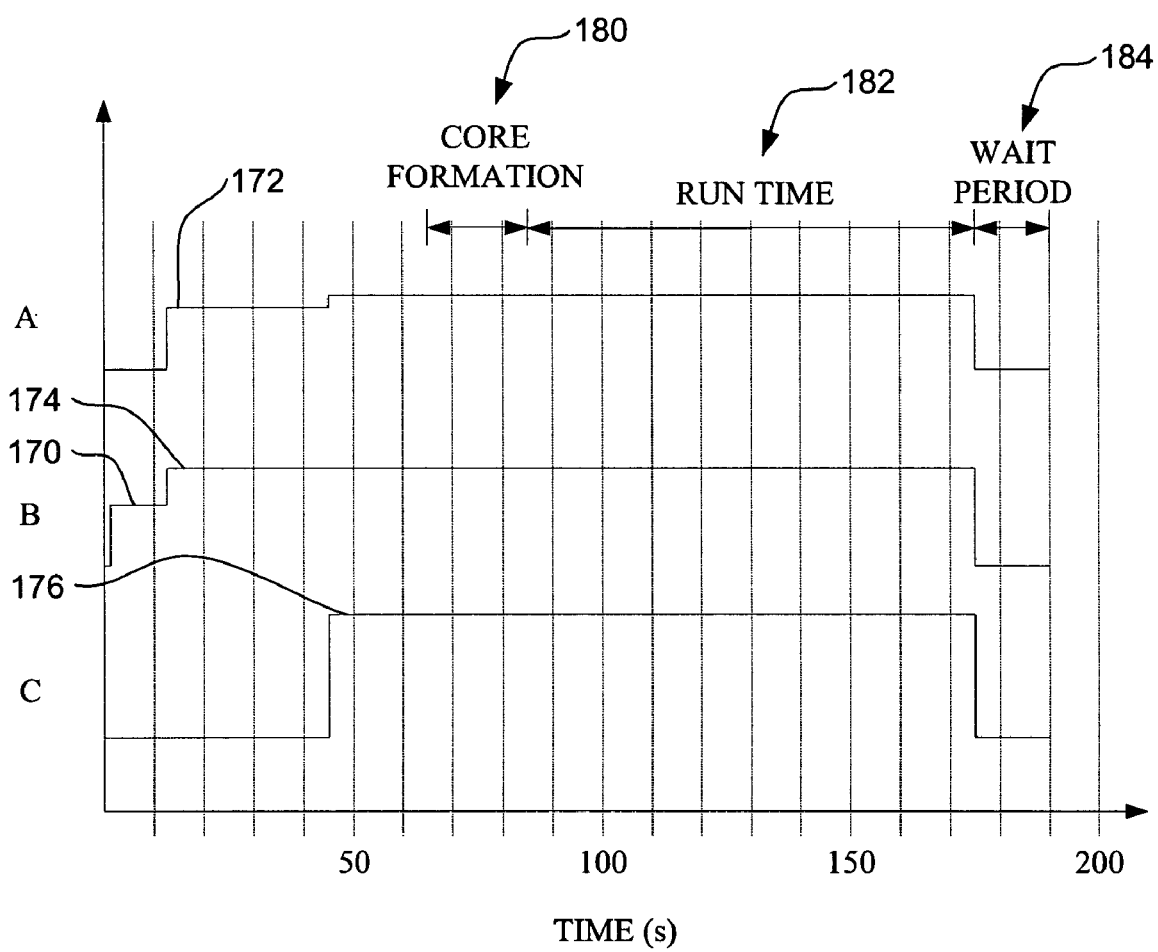
FIG. 11 is a timing diagram showing an illustrative timing protocol for the microfluidic cartridge of FIG. 1.

FIG. 11 is a timing diagram showing an illustrative timing protocol for the illustrative microfluidic cartridge 10 of FIG. 1. In the illustrative diagram, channel "A" corresponds to the first flow channel 12 of FIG. 1, channel "B" corresponds to the second flow channel 14, and channel "C" corresponds to the fourth flow channel 20.

In the illustrative timing diagram, a blood sample is first initiated at a first blood sample flow rate 170 in channel "B". This is continued for about twelve seconds. Then, a lyse reagent is initiated at a first lyse flow rate 172, and at the same time the blood sample flow rate is increased to a second blood sample flow rate 174. In this example, the blood sample flow rate is increased to help prevent a backflow of the blood sample in the second flow channel 14.

This sequence allows the lysing reagent and the blood sample to arrive at the first intersecting region 16 at about the same time. The first intersecting region 16 may be adapted to inject a ribbon of the blood sample between two sheathing layers of lyse reagent. The ribbon is stretched thinner during acceleration into the third flow channel 18. In some cases, the blood sample ribbon is two to three cells thick, so all of the blood cells are close to the lysing reagent, and all cells are exposed to the lysing reagent for an equal time. This "lysing on the fly" may provide more consistent results than batch lysing. The length of the third flow channel 18 may have a length that results in the blood sample being lysed for a desired amount of time before reaching the second intersecting region 22.

A sheath fluid is activated in channel "C" at a sheathing fluid flow rate 176. Thus occurs about 32 seconds after the lysing reagent is activated in channel "A". At the same time, the lyse flow rate is slightly increased to help prevent a backflow in the third flow channel 18. As noted above, the second intersecting region 22 may be configured to arrange the blood cells in the lysed blood sample into a single file so that they can be individually interrogated by a microfluidic cartridge reader as they pass through optical window region 26. In the illustrative embodiment, twenty seconds is provided to achieve a consistent core flow through the fifth flow channel 24 in the region of the optical window region 26, as shown at 180. This is followed by a run time period 182 having a duration of about 90 second, where the cells in the core are optically interrogated by a microfluidic cartridge reader. After the run time period 182 expires, the flows in the first, second and third flow channels are terminated, and a fifteen second wait period 184 is entered. The wait period 184 may allow sufficient time to properly shut down the pressure sources, as well as close any valves on the microfluidic cartridge 10 and/or perform any other shut down operations. It should be recognized that this timing protocol is only given as an example, and that the particular sequence of events and timing of events will depend on the particular microfluidic cartridge design.

Figure 12:
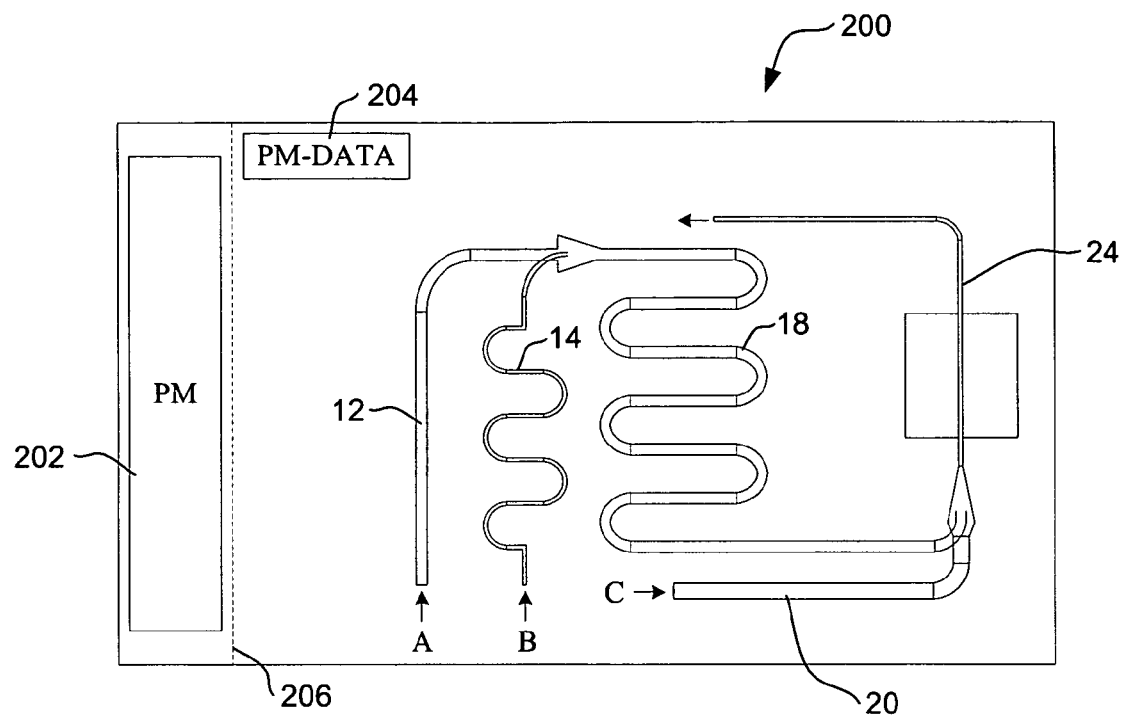
FIG. 12 is a schematic top view diagram showing certain select structures of an illustrative microfluidic cartridge that includes one or more fluidic processes monitor structures.

FIG. 12 is a schematic top view diagram showing certain select structures of an illustrative microfluidic cartridge that includes one or more fluidic processes monitor structures. As noted above, many microfluidic cartridges are manufactured from plastic laminates or molded parts, which can help reduce the size, cost and complexity of the microfluidic cartridge. However, while such manufacturing techniques may provide inexpensive parts, they are typically less dimensionally precise and repeatable, with asymmetrical dimensions and wider tolerance cross-sections. These process variations may produce variations in fluid flows, component performance, etc., from cartridge to cartridge—which can degrade the accuracy and/or performance of any timing protocols that are developed in advance for a particular class of microfluidic cartridges.

To help compensate for such process variations, it is contemplated that one or more fluidic process monitor components/structures may be fabricated along with the functional components/structures of the microfluidic cartridge. FIG. 12 show a microfluidic cartridge 200 that includes a separate process monitor region 202. It is contemplated, however, that the process monitor components/structures may be dispersed among the functional components/structures of the microfluidic cartridge, if desired.

Test may be performed on the process monitor components/structures to identify the process variations in the particular microfluidic cartridge at hand. For example, the process monitor components/structures may include a series of flow channels, sometimes with similar or identical dimensions as the first, second, third, fourth and fifth flow channels 12, 14, 18, 20 and 24 on the functional part of the microfluidic cartridge 200. Wet out times of some or all of the process monitor flow channels may be measured to identify the specific wet out times for the microfluidic cartridge at hand, rather than identifying wet out times for a class of microfluidic cartridges generally. When wet out times and/or other measured parameters for a microfluidic cartridge at hand are used, the timing protocol for the particular microfluidic cartridge may be more accurate.

It is contemplated that the some or all of the process monitor components/structures in the process monitor region 202 may be tested prior to shipment of the microfluidic cartridge 200. In some cases, data that is specific to the microfluidic cartridge 200 may be recorded on the microfluidic cartridge 200. In the illustrative embodiment shown in FIG. 12, the data may be recorded in a machine readable format in a process-monitor data region 204. For example, the data may be recorded as a bar code printed on the microfluidic cartridge 200. Alternatively, or in addition, the data may be recorded on an optical, magnetic or RF tag that is secured to the microfluidic cartridge 200. Any other sort of storage device may also be employed, including non-volatile memory and volatile memory, if desired.

In some cases, and after the data is recorded, the process monitor region 202 may be removed from the microfluidic cartridge 200 along line 206, if desired. This may be accomplished by, for example, cutting, sawing, or using any other suitable process. In some cases, a perforation may be provided along line 206, which may help "snap off" the process monitor region 202 from the remainder of the microfluidic cartridge 200.

Figure 13:
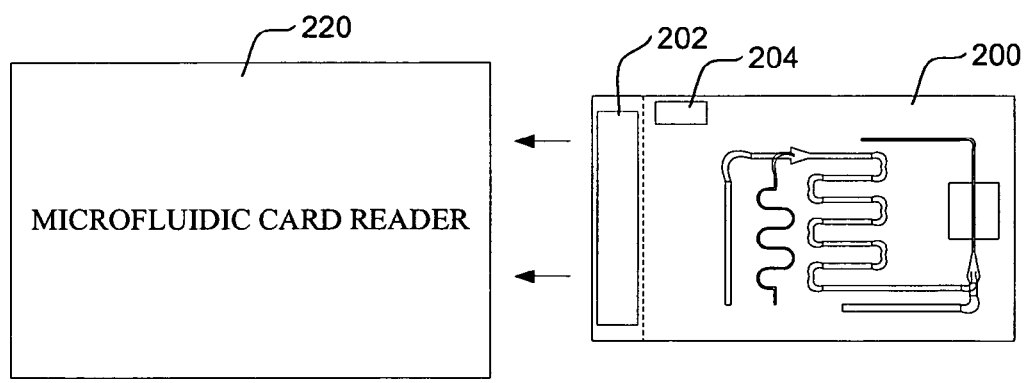
FIG. 13 is a schematic top view diagram showing a microfluidic card reader for operating the illustrative microfluidic cartridge of FIG. 12.

FIG. 13 is a schematic top view diagram showing a microfluidic card reader 220 for reading the illustrative microfluidic cartridge 200 of FIG. 12. In some embodiments, the microfluidic cartridge 200 is inserted into a slot or other opening in the microfluidic card reader 220. However, it is contemplated that any other suitable interface may be used to receive the microfluidic cartridge 200, as desired. The microfluidic card reader 220 may include the necessary hardware and/or software to operate the microfluidic cartridge 200. For example, the microfluidic card reader 220 may include pumps, valves, light sources and light detectors, a controller, etc. The controller may be adapted to implement a timing protocol for the microfluidic cartridge 200, as discussed herein.

In some cases, the microfluidic card reader 220 may include a reader that is capable of reading the machine readable indicia recorded in the process-monitor data region 204. Using this data, the operation of the microfluidic card reader 220 may be altered (e.g. customized) to accommodate the process variations present in the particular microfluidic cartridge 200. For example, the start times, flow rates and/or other parameters of some timing protocols may be changed based on the process monitor data read from the process-monitor data region 204.

In some cases, an entire timing protocol may be recorded in the process-monitor data region 204. Alternatively, or in addition, the type of card, the reagents used, the model number, the serial number, as well as other parameters may be recorded in the process-monitor data region 204. This may help prevent errors during use, because some or all of the card characteristics may be read and used by the microfluidic card reader 220.

In some embodiments, the microfluidic card reader 220 may be capable of performing some or all of the tests on the process monitor components/structures just prior to use. For example, the microfluidic card reader 220 may pump fluids through one or more flow channels in the process monitor region 202, and then based on the results, change some of the parameters of the timing protocol that is ultimately used by the microfluidic card reader 220 during function operation of the microfluidic cartridge 200.

Figure 14:
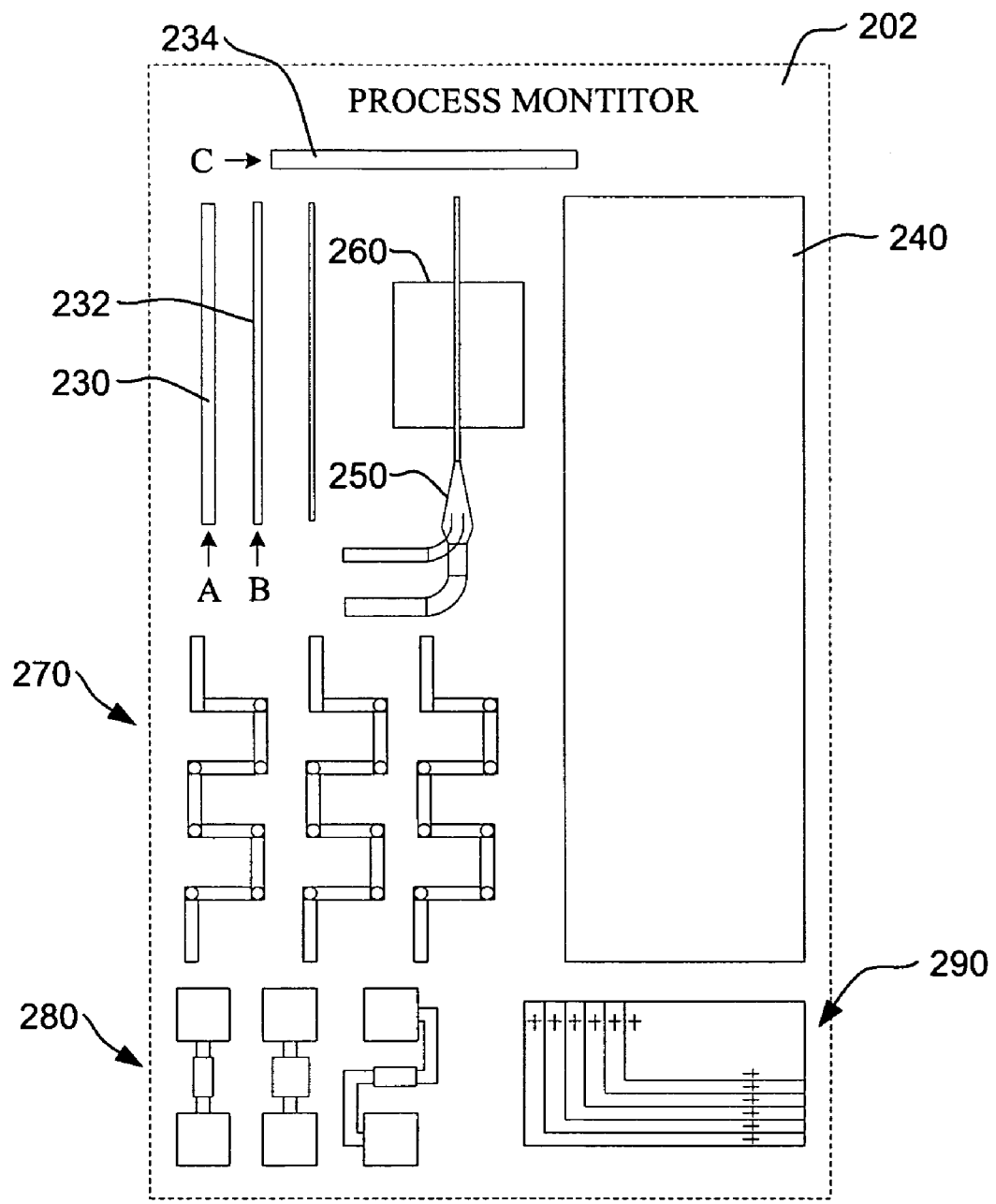
FIG. 14 is a more detailed schematic top view diagram showing the process monitor region of the illustrative microfluidic cartridge of FIG. 12.

FIG. 14 is a more detailed schematic top view diagram showing the process monitor region 202 of the illustrative microfluidic cartridge 200 of FIG. 12. As can be seen in the illustrative embodiment, the process monitor region 202 may include a variety of process monitor components/structures, as desired. For example, the process monitor region 202 may include process monitor flow channel structures 230, 232 and 234, which may have the same cross-sectional dimensions, and in some cases the same overall shape, as the functional flow channels 12, 14 and 20 on the functional part of the card. Because the process monitor flow channel structures 230, 232 and 234 are fabricated at the same time as the functional flow channels 12, 14 and 20, data collected from the process monitor flow channel structures 230, 232 and 234 may be highly predictive of the performance of the functional flow channels 12, 14 and 20.

Other types of process monitor components/structures may also be provided. For example, a reservoir 240 may be provided. Likewise, a copy of the second intersecting region 22 may be provided as shown at 250, was well as a copy of the optical window 26 as shown at 260. Other structures may also be provided including, for example, various flow channels 270 that extend between various lamination layers of the microfluidic cartridge 200, one or more valves 280, layer alignment features 290, as well as any other suitable components/structures that may provide relevant data regarding the process/fabrication variations in the microfluidic cartridge 200.

Figure 15:
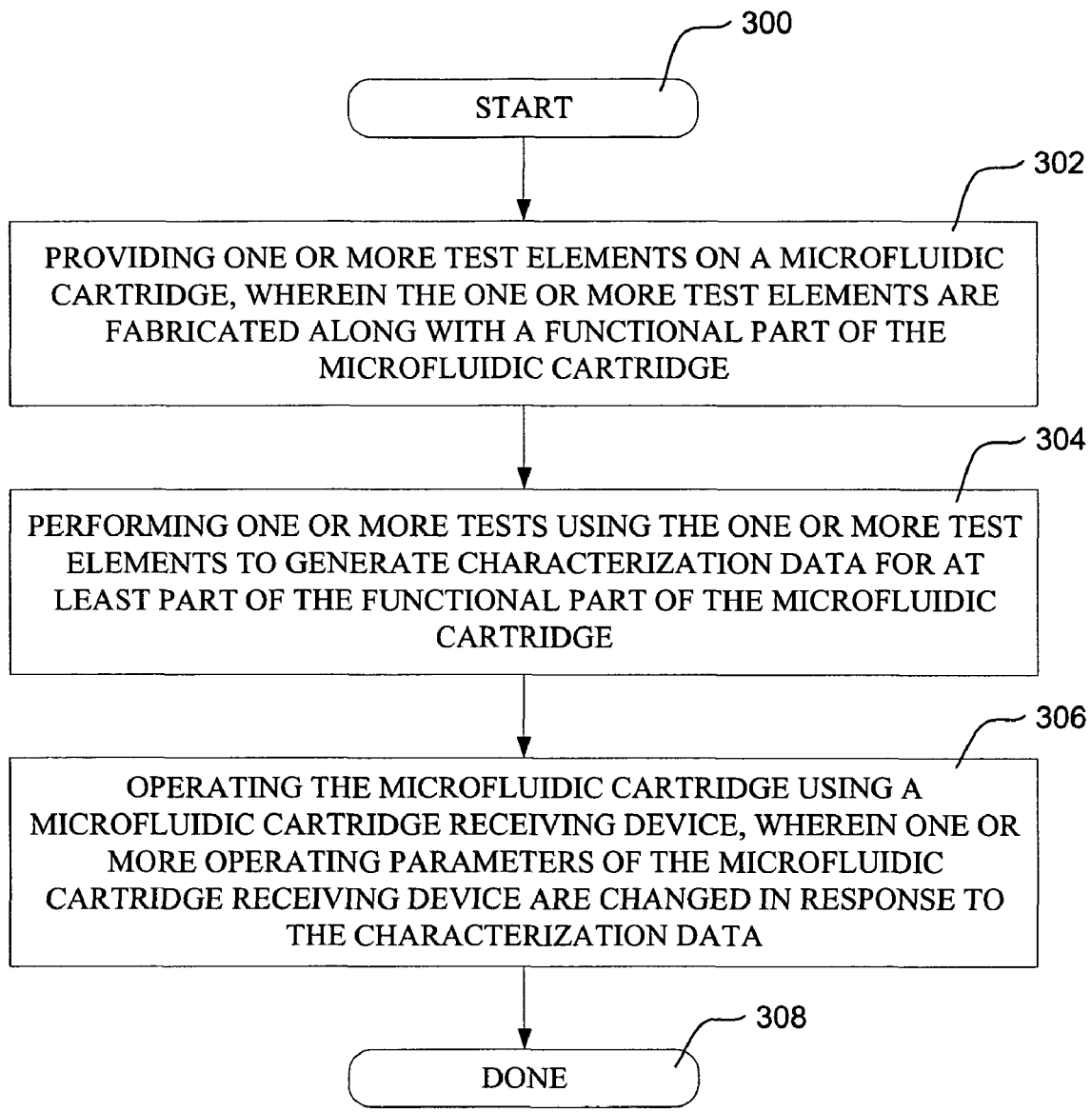
FIG. 15 is a flow diagram showing an illustrative method for characterizing and operating a microfluidic cartridge.

FIG. 15 is a flow diagram showing an illustrative method for characterizing and operating a microfluidic cartridge. The flow diagram is entered at step 300, and control is passed to step 302. Step 302 provides one or more test elements on a microfluidic cartridge, wherein the one or more test elements are fabricated along with a functional part of the microfluidic cartridge. Control is then passed to step 304. Step 304 performs one or more tests using the one or more test elements to generate characterization data for at least part of the functional part of the microfluidic cartridge. Control is then passed to step 306. Step 306 operates the microfluidic cartridge using a microfluidic cartridge reader or the like, wherein one or more operating parameters of the microfluidic cartridge reader are changed in response to the characterization data. Control is then passed to step 308, wherein the flow diagram is exited.

Figure 16:
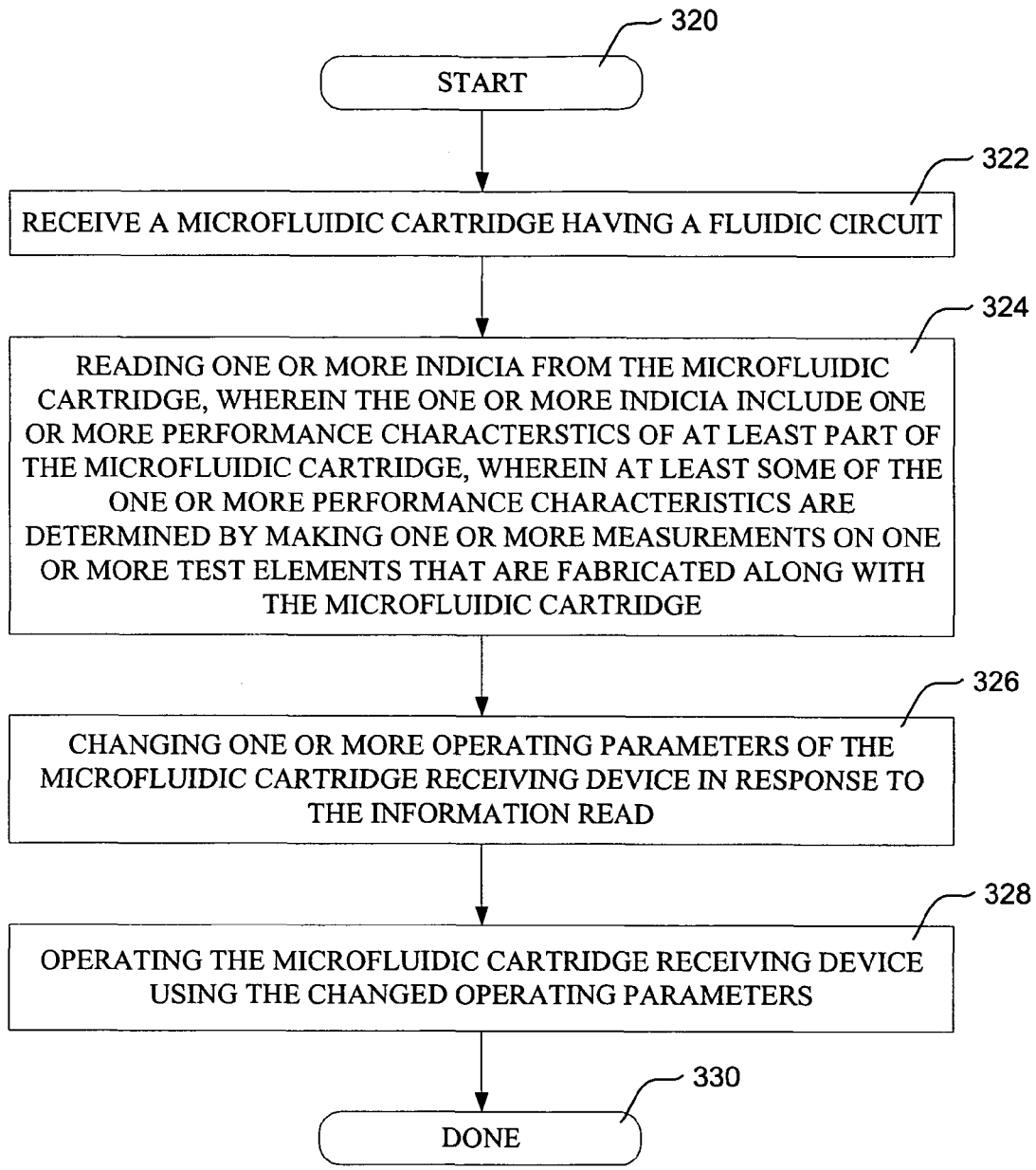
FIG. 16 is a flow diagram showing another illustrative method for operating a microfluidic cartridge.

FIG. 16 is a flow diagram showing another illustrative method for operating a microfluidic cartridge. The flow diagram is entered at step 320, and control is passed to step 322. Step 322 receives a microfluidic cartridge having a fluidic circuit. Control is then passed to step 324. Step 324 reads one or more indicia from the microfluidic cartridge, wherein the one or more indicia include one or more performance characteristics of at least part of the microfluidic cartridge. At least some of the one or more performance characteristics are determined by making one or more measurements on one or more test elements that are fabricated along with the microfluidic cartridge. Control is then passed to step 326. Step 326 changes one or more operating parameters of a microfluidic cartridge reader or the like in response to the information read. Control is then passed to step 328. Step 328 operates the microfluidic cartridge reader or the like using the changed operating parameters. Control is then passed to step 330, wherein the flow diagram is exited.

Figure 17:
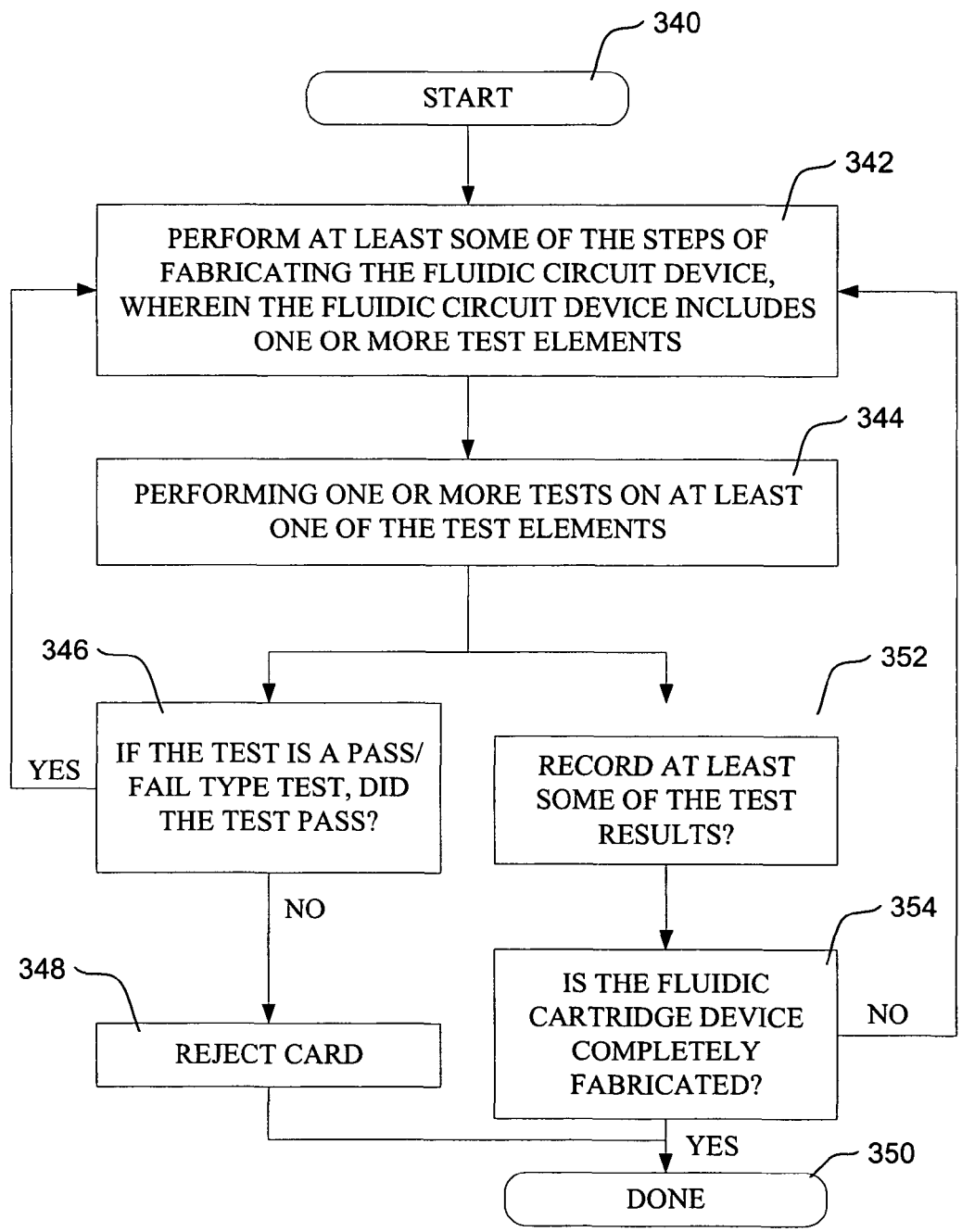
FIG. 17 is a flow diagram showing yet another illustrative method for characterizing a microfluidic cartridge.

FIG. 17 is a flow diagram showing yet another illustrative method for characterizing a microfluidic cartridge. The flow diagram is entered at step 340, and control is passed to step 342. Step 342 performs at least some of the steps of fabricating the fluidic circuit device, wherein the fluidic circuit device includes one or more test elements. Control is then passed to step 344. Step 344 performs one or more tests on at least one of the test elements. If the test is a pass/fail type test, control is passed to step 346, wherein it is determine if the test passed or failed. If the test passed, and additional fabrication steps are required to complete the fluidic circuit device, control is passed back to step 342. If the test failed, control is passed to step 348, wherein the microfluidic cartridge is rejected. Control is then passed to step 350, wherein the flow diagram is exited.

Referring back to step 344, if the test was not a pass/fail type test, at least some of the test results are recorded, as shown at step 352. Control is then passed to step 354. Step 354 determines whether the fluidic cartridge device is completely fabricated. If the fluidic cartridge device is not completely fabricated, control is passed back to step 342. However, if the fluidic cartridge device is completely fabricated, control is passed to step 350, wherein the control diagram is exited.

Figure 18:
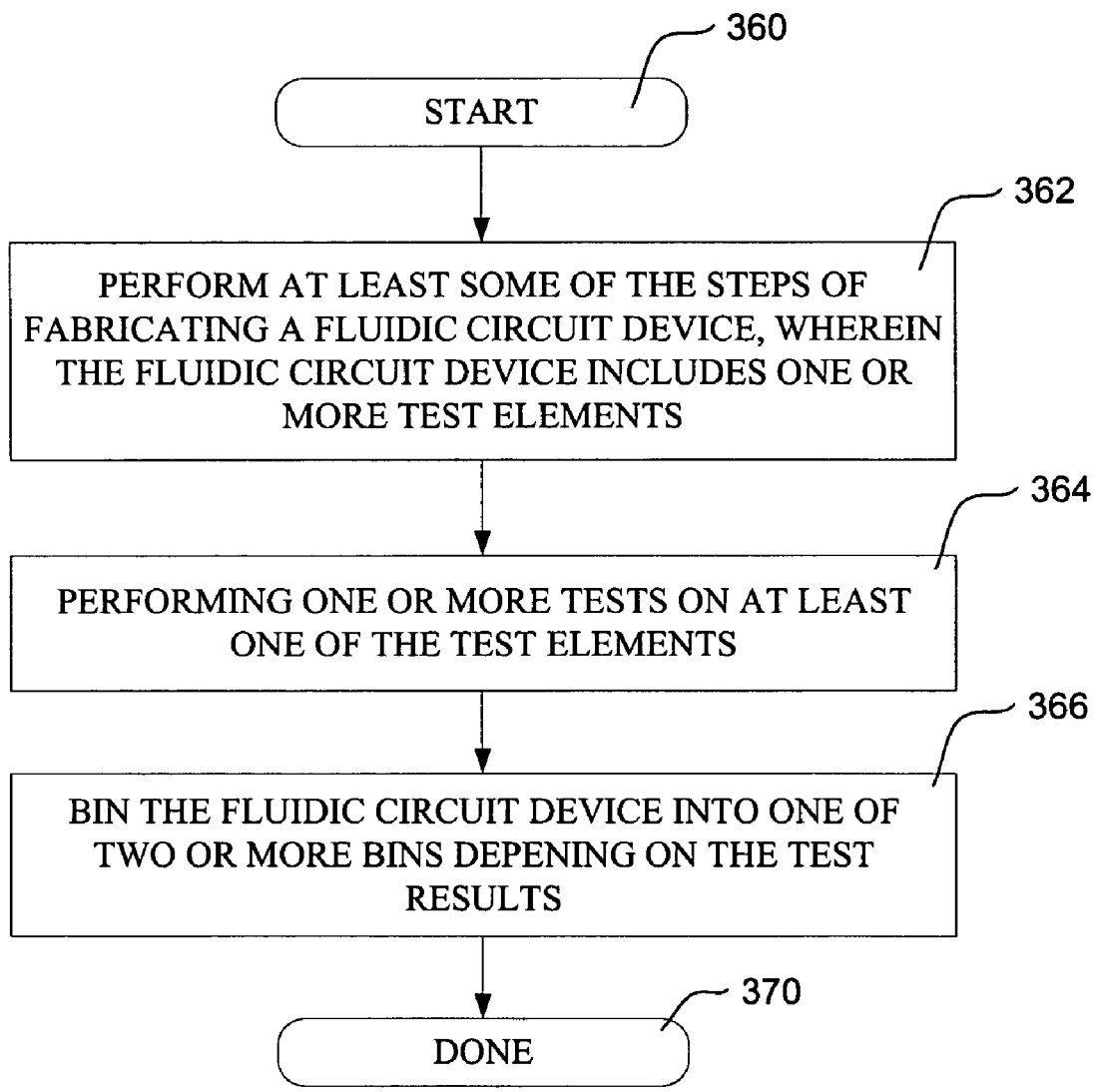
FIG. 18 is a flow diagram showing an illustrative method for binning microfluidic cartridges.

FIG. 18 is a flow diagram showing an illustrative method for binning microfluidic cartridges. The flow diagram is entered at step 360, wherein control is passed to step 362. Step 362 performs at least some of the steps of fabricating a fluidic circuit device, wherein the fluidic circuit device includes one or more test elements. Control is then passed to step 364. Step 364 performs one or more tests on at least one of the test elements. Control is then passed to step 366. Step 366 bins the microfluidic circuit device into one of two or more bins depending on the test results. Control is then passed to step 370, wherein the flow diagram is exited.

Having thus described the preferred embodiments of the present invention, those of skill in the art will readily appreciate that the teachings found herein may be applied to yet other embodiments within the scope of the claims hereto attached.

What is claimed is:

1. A method for controlling the flow of fluid through a microfluidic cartridge, wherein the microfluidic cartridge includes two or more flow channels, wherein the two or more flow channels are fluidly connected at an intersection region, which is fluidly connected to a downstream flow channel, the method comprising the steps of:
   causing flow of a first fluid in a first flow channel by applying a pressure to the first fluid from a first volume driven pressure source;
   slowing or stopping the flow of the first fluid in the first flow channel when the first fluid reaches a predetermined location relative to the intersection region by reducing or eliminating the pressure applied from the first volume driven pressure source;
   after the flow of the first fluid is slowed or stopped, causing a second fluid in the second flow channel to pass through the intersection region by applying a pressure to the second fluid from a second pressure source; and
   with the second fluid passing through the intersection region, causing the flow of the first fluid in the first flow channel to flow through the intersection region by increasing the pressure from the first volume driven pressure source.

2. The method of claim 1 wherein the pressure provided by the first volume driven pressure source is controlled by one or more valves.

3. The method of claim 1 wherein the pressure provided by the first volume driven pressure source is controlled by one or more electrical signals.

4. The method of claim 1 wherein a second pressure source is used to cause the second fluid to flow through the second flow channel.

5. The method of claim 4 wherein the pressure provided by the second pressure source is controlled by one or more valves.

6. The method of claim 4 wherein the pressure provided by the second pressure source is controlled by one or more electrical signals.

7. The method of claim 4 wherein the second pressure source is a volume driven source.

8. The method of claim 1 wherein the predetermined location is upstream of the intersection region.

9. The method of claim 1 wherein the predetermined location is at or substantially at the intersection region.

10. The method of claim 1 wherein the predetermined location is downstream of the intersection region.

11. The method of claim 1 further comprising the step of slowing or stopping the flow of the second fluid in the second flow channel when the second fluid is upstream of the intersection region prior to causing the second fluid in the second flow channel to pass through the intersection region.

12. A method for controlling the flow of fluid through a microfluidic cartridge, wherein the microfluidic cartridge includes two or more flow channels, wherein the two or more flow channels are fluidly connected at an intersection region, which is fluidly connected to a downstream flow channel, and wherein the first flow channel extends along a path that extends between a first fixed location and the intersection region, the method comprising the steps of:

causing flow of a first fluid in the first flow channel at a first flow rate using a first pressure source, wherein the first pressure source applies a pressure to the first flow channel, and thus to the flowing first fluid, by delivering a pressure to the first fixed location of the first flow channel;

causing flow of a second fluid in a second flow channel at a second flow rate by applying a pressure to the second fluid from a second pressure source;

altering the flow rates of the first and/or second fluids in the first and second flow channels, respectively, when one of the first and second fluids reaches a predetermined location relative to the intersection region, such that one of the first and second fluids passes through the intersection region and the other of the first and second fluids remains upstream of the intersection region; and causing the other of the first and second fluids to pass through the intersection region such that both the first and second fluids are then passing through the intersection region.

13. The method of claim 12 wherein the first and second flow rates are controlled by one or more valves controlled by one or more electrical signals.

14. The method of claim 12 wherein the step of altering the flow rates involves slowing or stopping the flow of the first fluid in the first flow channel when the first fluid reaches the predetermined location by reducing or eliminating the pressure applied from the first pressure source.

15. The method of claim 12 wherein the step of altering the flow rates involves increasing the first flow rate of the first fluid in the first flow channel when the fluid in the first flow channel reaches or substantially reaches the predetermined location.

16. A method for controlling the flow of fluid through a microfluidic cartridge, wherein the microfluidic cartridge includes two or more flow channels, wherein the two or more flow channels are fluidly connected at an intersection region, which is fluidly connected to a downstream flow channel, the method comprising the steps of:

causing flow of a first fluid in a first flow channel by applying a pressure to the first fluid from a first pressure source such that the first pressure source does not move along the first flow channel as the first fluid flows;

slowing or stopping the flow of the first fluid in the first flow channel when the first fluid reaches a predetermined location relative to the intersection region by reducing or eliminating the pressure applied from the first pressure source;

causing a second fluid in the second flow channel to pass through the intersection region by applying a pressure to the second fluid from a second pressure source; and causing the flow of the first fluid in the first flow channel to flow through the intersection region by increasing the pressure from the first pressure source.

17. The method of claim 16 wherein the pressure provided by the first pressure source is controlled by one or more valves.

18. The method of claim 16 wherein the pressure provided by the first pressure source is controlled by one or more electrical signals.

19. The method of claim 16 wherein the pressure provided by the second pressure source is controlled by one or more valves.

20. The method of claim 16 wherein the pressure provided by the second pressure source is controlled by one or more electrical signals.

21. The method of claim 16 wherein the first pressure source is a volume driven source.

22. The method of claim 16 wherein the second pressure source is a volume driven source.

23. The method of claim 16 wherein the predetermined location is before the intersection region.

24. The method of claim 16 wherein the predetermined location is at or substantially at the intersection region.

25. The method of claim 16 wherein the predetermined location is past the intersection region.

26. The method of claim 16 further comprising the step of slowing or stopping the flow of the second fluid in the second flow channel when the second fluid is before the intersection region prior to causing the second fluid in the second flow channel to pass through the intersection region.

27. The method of claim 16 wherein the first pressure source causes the first fluid to flow in the first flow channel at a first flow rate, and the second pressure source causes the second fluid to flow in the second flow channel at a second flow rate.

28. The method of claim 27 wherein the first and second flow rates are controlled by one or more valves controlled by one or more electrical signals.

* * * * *